United States Patent [19]
Kushita

[11] Patent Number: 5,854,592
[45] Date of Patent: Dec. 29, 1998

[54] PAGING RECEIVER WITH IMPROVED SYNCHRONIZATION TECHNIQUES

[75] Inventor: Masayuki Kushita, Tokyo, Japan

[73] Assignee: NEC Corporation, Tokyo, Japan

[21] Appl. No.: 740,412

[22] Filed: Oct. 29, 1996

[30] Foreign Application Priority Data

Oct. 30, 1995 [JP] Japan ................................. 7-281312

[51] Int. Cl.⁶ .................................................. H04L 7/00
[52] U.S. Cl. ..................... 340/825.21; 370/350; 375/365
[58] Field of Search ........................ 340/825.2, 825.21, 340/825.44; 370/314, 349, 350; 375/354, 355, 357, 359, 365

[56] References Cited

U.S. PATENT DOCUMENTS

| | | | |
|---|---|---|---|
| 4,803,703 | 2/1989 | DeLuca et al. | 375/365 |
| 5,495,233 | 2/1996 | Kawashima et al. | 370/350 |
| 5,525,974 | 6/1996 | Matai | 340/825.44 |
| 5,555,183 | 9/1996 | Willard et al. | 340/825.21 |
| 5,619,507 | 4/1997 | Tsuda | 370/350 |
| 5,712,624 | 1/1998 | Ayerst et al. | 340/825.21 |

FOREIGN PATENT DOCUMENTS 1-120924  5/1989  Japan.

*Primary Examiner*—Michael Horabik
*Assistant Examiner*—Edward Merz
*Attorney, Agent, or Firm*—Scully, Scott, Murphy & Presser

[57] ABSTRACT

In a wireless selective calling receiver, after synchronization establishment, when a received frame synchronization signal or a received frame identifying signal fails to be detected, the intermittent receiving timing is determined based on an ideal frame identifying value which was produced at a preceding intermittent receiving timing. Further when the received frame identifying value is coincident with the ideal frame identifying value, the intermittent receiving timing is determined based on the ideal frame identifying value. And, a next ideal frame identifying value which should be received at a next intermittent receiving timing is produced based on the ideal frame identifying value and then is stored to be used at the next intermittent receiving timing.

18 Claims, 19 Drawing Sheets

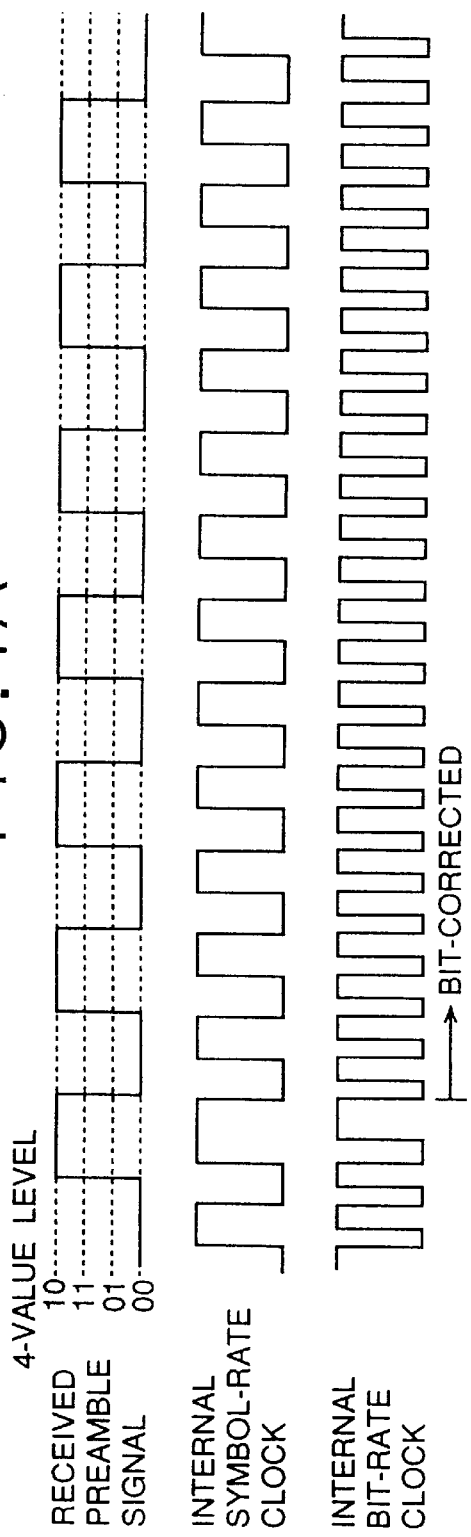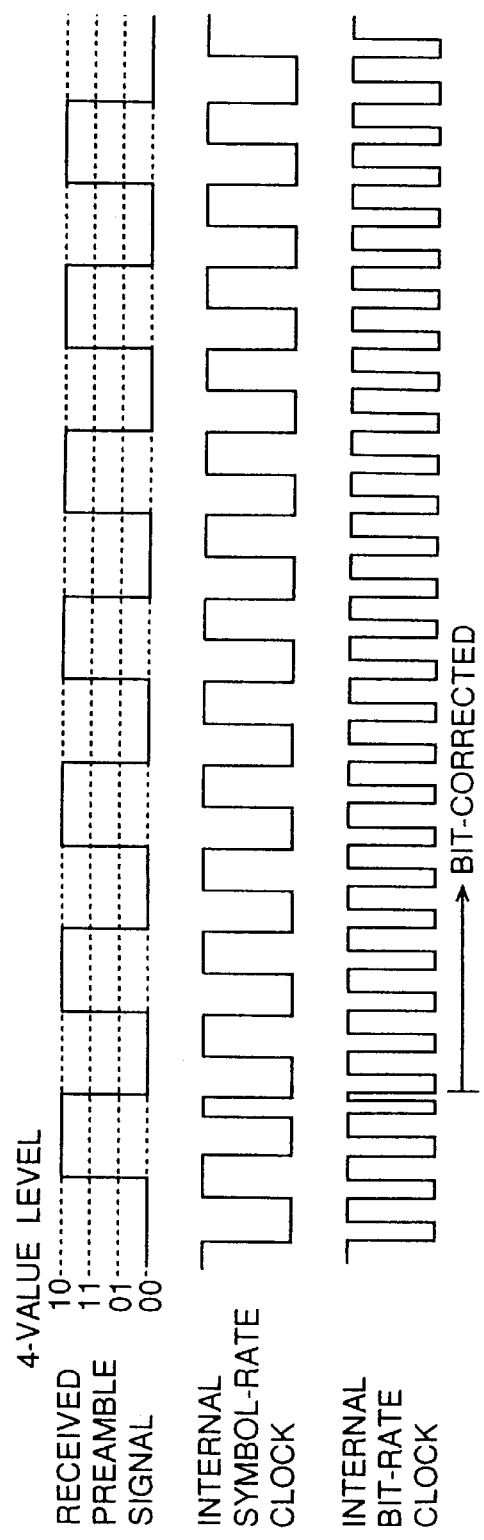

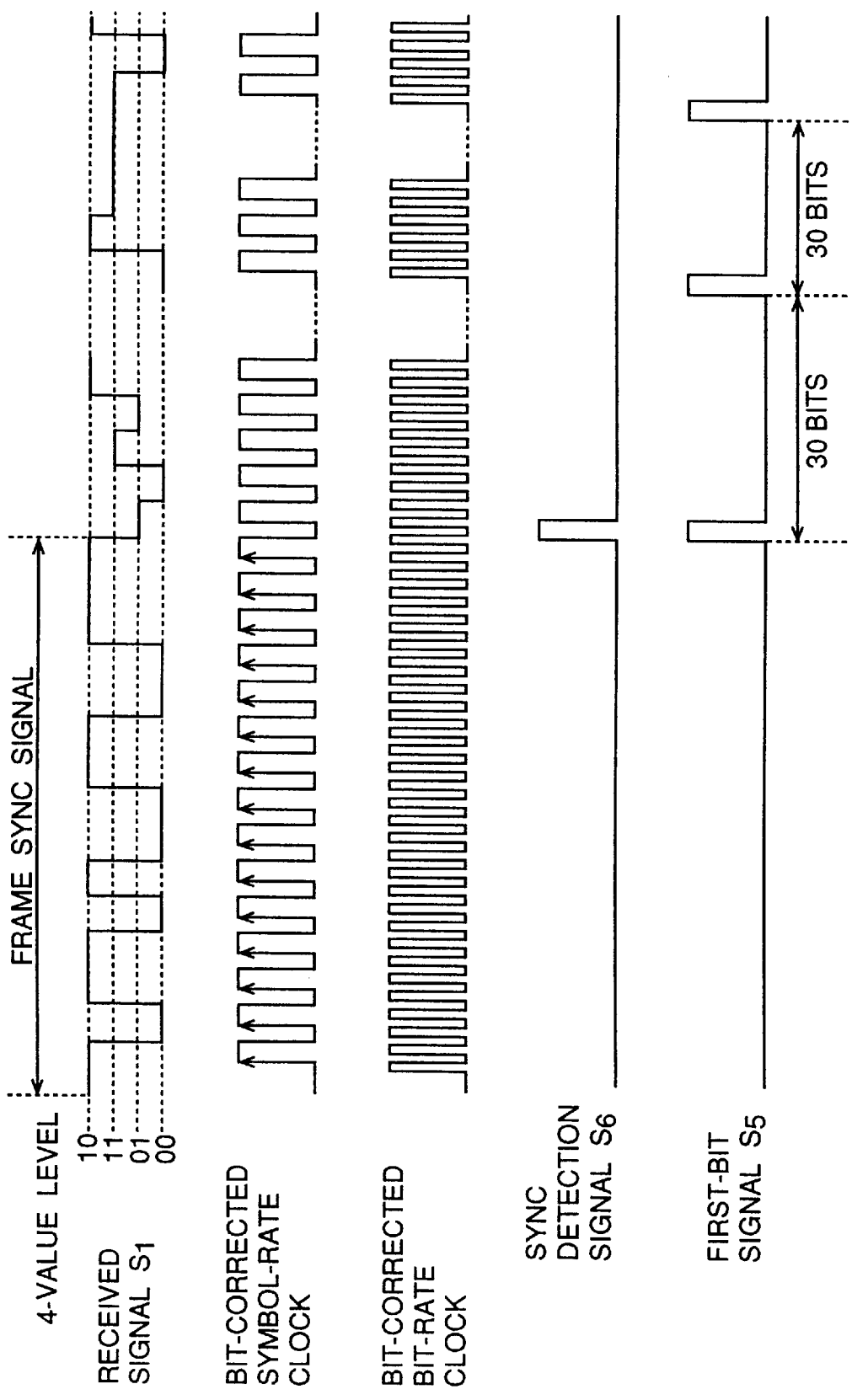

PAGING RECEIVER WITH IMPROVED SYNCHRONIZATION TECHNIQUES

BACKGROUND OF THE INVENTION

1. Field of the Invention

The present invention relates to a wireless selective calling receiver and, more specifically, to a wireless selective calling receiver which intermittently receives a transmission signal from a base station in a synchronous transmission scheme.

2. Description of the Related Art

In a radio communication system which periodically transmits a radio signal having a frame synchronization signal followed by a frame information signal identifying a frame position, a wireless selective calling receiver generally employs an intermittent receiving scheme so as to save the battery power.

A conventional wireless selective calling receiver performs an intermittent receiving operation as shown in a process flow of FIG. 1. Specifically, after the power-on (step F40), a frame sync flag SYNC is set to 0 (non-synchronization state) (step F41). An intermittent receiving operation is performed for pulling into synchronization (step F2) until a frame sync signal and a frame information signal are detected normally. Once a frame sync signal and a frame information signal are detected normally (Yes at step F43 and then Yes at step F45), a sync counter which provides the intermittent receiving timing is set based on the received frame information and the frame sync flag SYNC is set to 1 (frame synchronization state) (step F46). After the frame synchronization is established, an intermittent receiving operation in which reception is effected at a predetermined frame position is performed.

In the above conventional technique, however, the sync counter is updated each time the received frame information is detected normally regardless of whether the received frame information is identical to the predetermined ideal frame information. Therefore, there is a possibility that when the sensitivity of the receiver falls due to sudden occurrence of noise or temporary entrance into an area of poor reception of radio waves, a frame information signal in which errors have occurred at more than an error detectable or correctable number of bits to become another correct code is received as it it were a correct frame information signal. Even in this case, since the sync counter is set based on the received frame information, the intermittent receiving timing which is provided by the sync counter deviates from a correct frame position to be received, resulting in call losses and a waste of buttery power because of useless power being supplied to a radio receiver.

Another conventional frame synchronization system of local area network is disclosed in Japanese Patent Unexamined Publication No. 1-120924. This conventional system is designed for receiving a transmission signal comprising a plurality of frames each including a frame synchronization signal-and a frame number as shown in FIG. 2A.

The process flow of this conventional frame synchronization system is shown in FIG. 2B. In a receiving operation in out-of-sync state (step F52), when the frame synchronization has been detected consecutively at M times (steps F53, F59 and F60, and Yes at the step F61), the next frame number is predicted based on the received frame number (step F62) and then the receiving operation is started in a quasi-syhchronization state (step F64). In the quasi-synchronization state (F64), when a received frame number is coincident with the predicted frame number which was calculated at the preceding time (step F65), the receiving operation is started in the synchronization state (step F66). on the other hand, when the frame synchronization fails to be detected consecutively at N times (No at step F53, Yes at step F54, step F56, and then Yes at step F57), the predicted frame number is reset (step F58) and then the control goes back to the out-of-sync receiving operation (step F52).

This system achieves the reduced time required for synchronization establishment starting from the out-of-sync state. However, after the synchronization establishment, the receiving operation is performed without regard for whether the received frame information is identical to the predetermined ideal frame information. Therefore, in this conventional system, the same problem as described before is also left as an outstanding problem.

In recent years, as one measure to accommodate the increasing transmission rate in the wireless selective calling signal scheme, a transmission technique of modulating and transmitting a 4-value signal comes to be employed instead of the previous signal scheme in which a 2-value signal is modulated and transmitted. Even in this scheme of transmitting a 4-value signal, each of a preamble signal that is used to detect an intermediate level of a signal and to take bit synchronization and a frame sync signal that is used to take frame synchronization is constituted of the lowest and highest levels of the four values, and hence is substantially equivalent to a 2-value signal. Therefore, in a situation that the sensitivity of the receiver is not high, after synchronization establishment, it is likely that although a frame sync signal is detected, ensuing frame information, which in in four values, is detected erroneously or as incorrect information caused by accidental conversion.

SUMMARY OF THE INVENTION

An object of the present invention is to provide a receiving method which is able to prevent call losses and a waste of battery current which are caused by erroneous intermittent receiving timing after synchronization establishment.

Another object of the present invention is to provide a method which provides a synchronization intermittent receiving operation with reliability.

Still another object of the present invention is to provide a wireless selective calling receiver which la able to achieve reliable communications after synchronization establishment without wasting the battery energy even when the sensitivity of the receiver falls suddenly for a short time.

According to the present invention, after synchronization establishment, when a received frame synchronization signal fails to be detected or when a received frame identifying signal fails to be detected normally the synchronization state is maintained based on an ideal frame identifying value which was produced at a preceding intermittent receiving timing.

According to an aspect of the present invention, an ideal frame identifying value which was produced at a preceding intermittent receiving timing is stored in each intermittent receiving timing. After a received frame synchronization signal and a received frame identifying signal is detected from the received transmission signal normally to produce a received frame identifying value, the received frame identifying value is compared with the ideal frame identifying value. The intermittent receiving timing is determined based on the ideal frame identifying value when either the received frame synchronization signal or the received frame identifying signal is not detected. Further when the received frame identifying value is coincident with the ideal frame identifying value, the intermittent receiving timing is determined based on the ideal frame identifying value. And, a next ideal frame identifying value which should be received at a next intermittent receiving timing is produced based on the ideal frame identifying value and then is stored to be used at the next intermittent receiving timing. Therefore, even when the sensitivity of the receiver falls due to sudden occurrence of noise or temporary entrance into an area of poor reception of radio waves, the intermittent receiving timing can be determined based on the ideal frame identifying value to maintain the synchronization.

In addition, preferably, in a case where the received frame identifying value is not coincident with the ideal frame identifying value, it is determined whether a predicted frame identifying value which was predicted at the preceding intermittent receiving timing is stored, and then the received frame identifying value is compared with the predicted frame identifying value when the predicted A frame identifying value is stored. When the received frame identifying value is coincident with the predicted frame identifying value, the intermittent receiving timing is determined based on the received frame identifying value, and a next predicted frame identifying value which should be received at the next intermittent receiving timing is predicted based on the received frame identifying value and is stored to be used at the next intermittent receiving timing. Therefore, even if the ideal frame identifying value is erroneous, the intermittent receiving timing can be determined based on the received frame identifying value to maintain the synchronization.

When either the received frame synchronization signal or the received frame identifying signal is not detected, it is preferable to predict a next predicted frame identifying value based on the predicted frame identifying value existing.

When the received frame identifying value is not coincident with the ideal frame identifying value, it is possible to cancel the synchronization establishment after the non-coincidence occurs consecutively at a predetermined number of times. Especially, such a method is suitable for a system where the synchronization is established when coincidence of a received frame value and an ideal frame value occurs consecutively at the predetermined number of times. Because the possibility of setting the frame counter section 108 to erroneous values at the time of synchronization establishment is thought to be very small. Further, this method is also suitable for a receiving scheme in which a receiving channel is locked to a channel of higher sensitivity by scanning a plurality of channels which are predetermined in a system at the time of pulling into synchronization.

According to another aspect of the present invention, when the received frame identifying value is not coincident with the predicted frame identifying value, the intermittent receiving timing is determined based on both the ideal frame identifying value and the received frame identifying value. And then a next predicted frame identifying value which should be received at the next intermittent receiving timing is predicted based on the received frame identifying value and is stored. Further, a next ideal frame identifying value which should be received at the next intermittent receiving timing is produced based on the ideal frame identifying value and is stored.

Since the intermittent receiving timing is determined based on both the ideal frame identifying value and the received frame identifying value until coincidence occurs, a frame to be received can be captured with reliability, resulting in the substantially reduced possibility that call losses occur due to a shift of intermittent receiving timing whether to use the ideal frame value or the received frame value.

BRIEF DESCRIPTION OF THE DRAWINGS

FIG. 7A is a timing chart showing an example of bit correction using a preamble signal in a case where the phase of an internal symbol-rate clock signal is advanced from the transmitted signal by ¼ of the symbol width;

FIG. 7B is a timing chart showing an example of bit correction using a preamble signal in a case where the phase of an internal symbol-rate clock signal is delayed the transmitted signal by ¼ of the symbol width;

FIG. 8 is a timing chart showing an example of signals in the receiver before and after detection of a frame sync signal;

DESCRIPTION OF THE PREFERRED EMBODIMENTS

Figure 1:
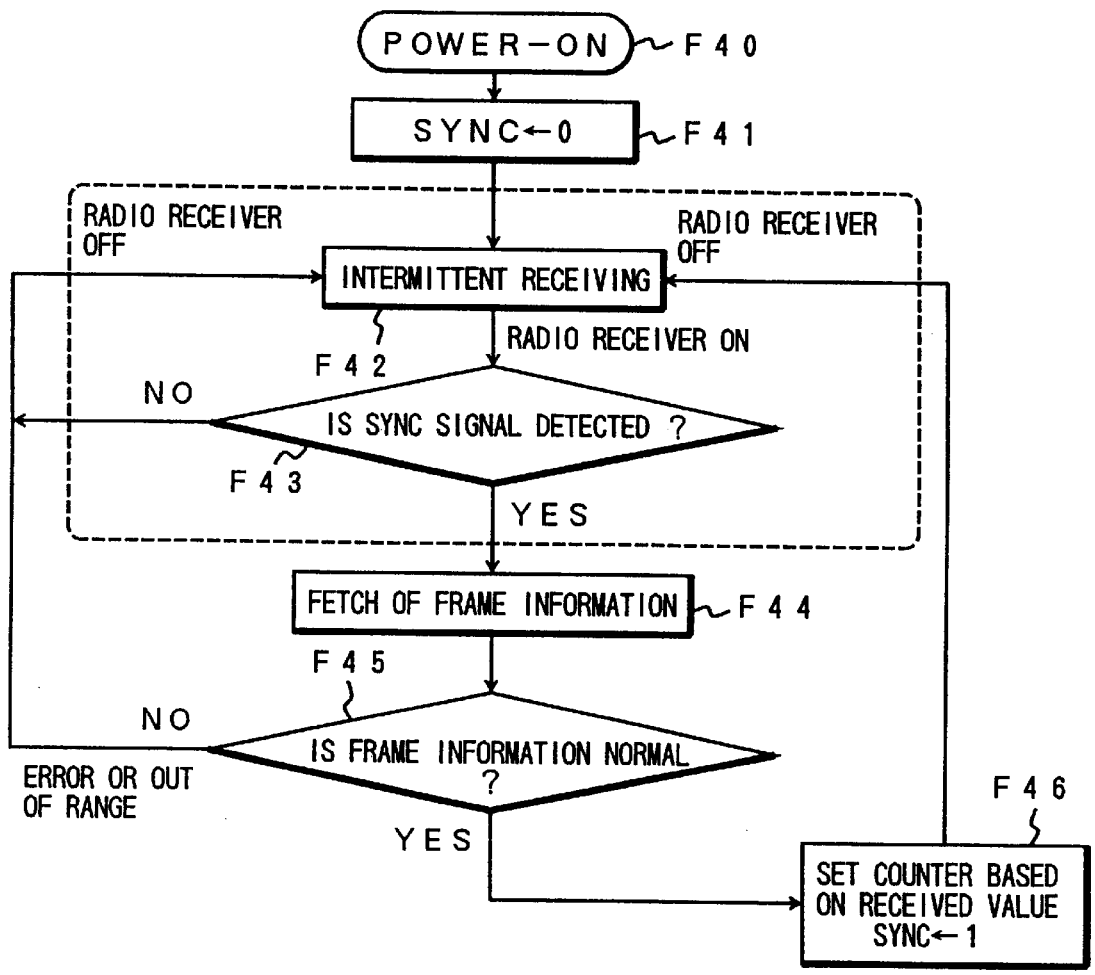
FIG. 1 is a flowchart showing an example of a conventional process flow.
Figure 2A:
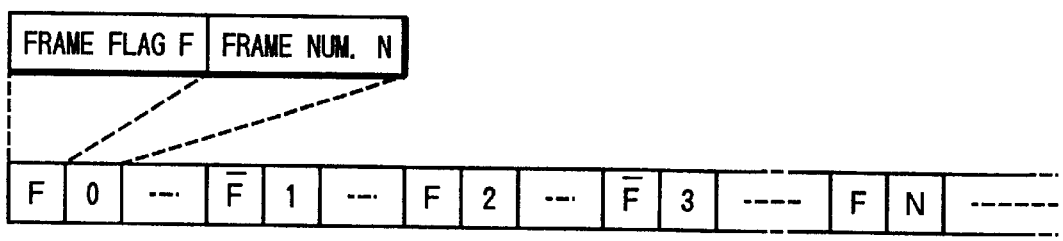
FIG. 2A is a schematic diagram showing an example of a transmission signal having a plurality of frames.
Figure 2B:
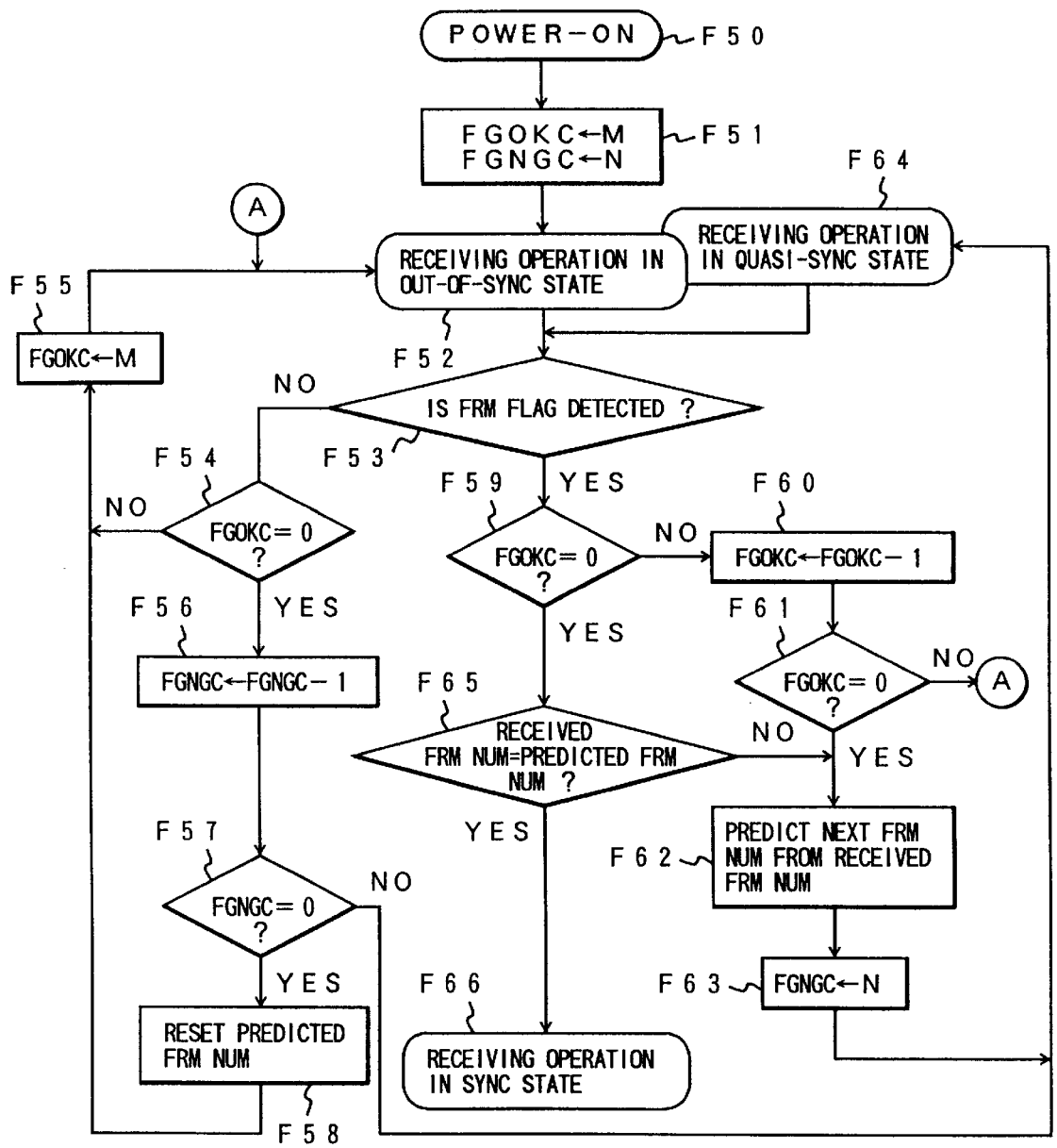
FIG. 2B is a flowchart showing another example of a conventional process flow in a frame synchronization system receiving the transmission signal of FIG. 2A.
Figure 3:
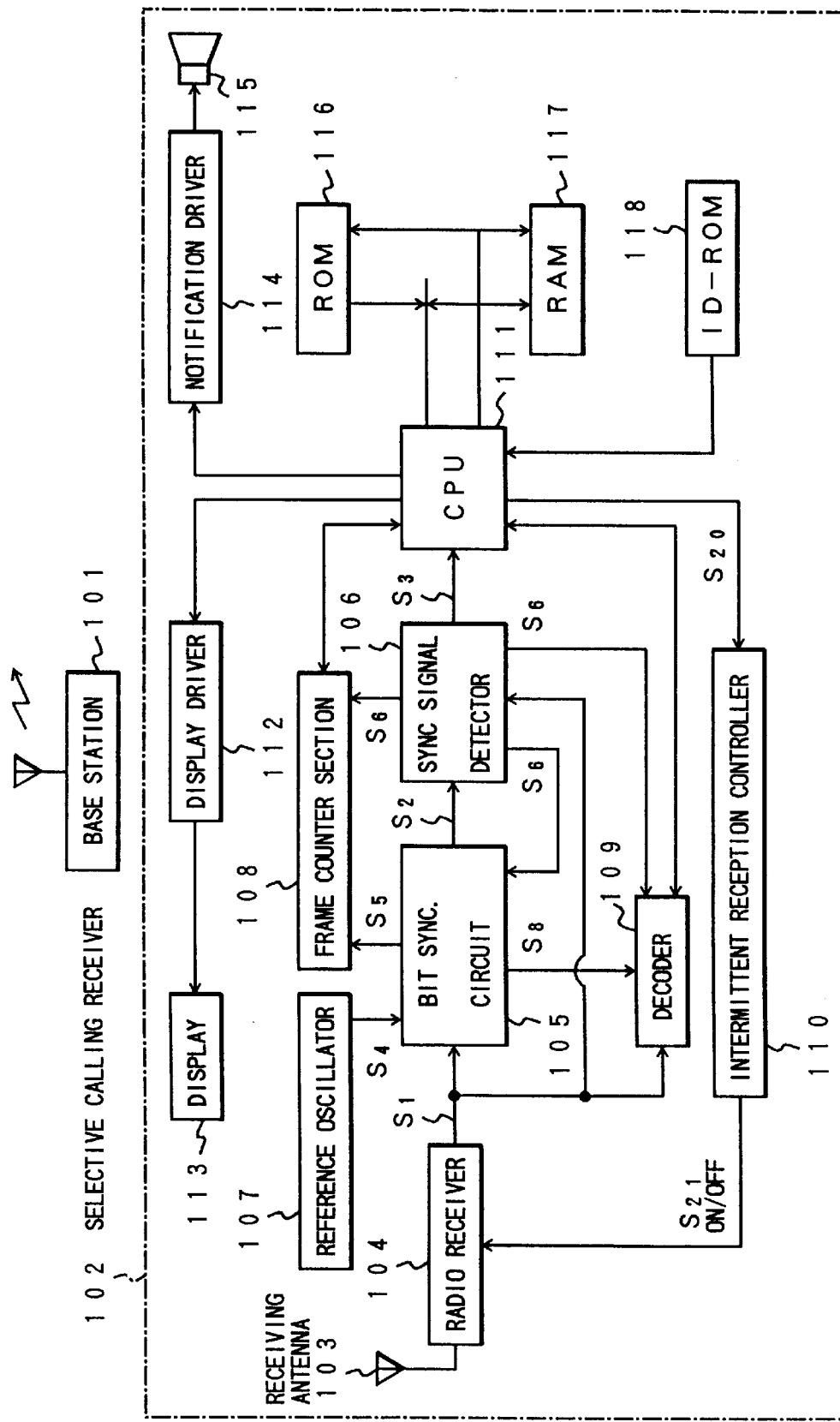
FIG. 3 is a block diagram showing an example of a wireless selective calling receiver to implement the present invention.

Referring to FIG. 3, a base station 101 sends a transmission signal of a given format (see FIG. 6) to a selective calling receiver 102 which receives the transmission signal at a receiving antenna 103. A received signal is input to a radio receiver 104 which amplifies, demodulates, and waveform-shapes the received signal, and outputs a received and demodulated signal $S_1$ to a bit synchronization circuit 105, a sync signal detector 106, and a decoder 109. Whether the radio receiver 104 should operate is determined based on a signal $S_{21}$ that is supplied from an intermittent reception controller 110. The intermittent reception controller 110 is controlled through a control signal $S_{20}$, which is generated by a processor (CPU) 111.

The bit synchronization circuit 105 generates a bit-rate clock signal and a symbol-rate clock signal by frequency-dividing a clock signal $S_4$ that is supplied from a reference oscillator 107. During operation of the radio receiver 104, the bit synchronization circuit 105 adjusts, when necessary, the phases of the generated clock signals so that they are in synchronization with the phase of the received signal $S_1$ by using the preamble signal and other signals of the received signal. This adjustment is hereinafter called "bit correction", which will be shown in FIG. 7. Resulting bit-corrected signals indicated by reference $S_2$ and $S_8$ are output to both the sync signal detector 106 and the decoder 109.

The sync signal detector 106 cuts out a bit sequence from the received signal $S_1$ by using the bit-corrected clock signals $S_2$ that are supplied from the bit synchronization circuit 105, and detects a frame sync signal from the bit sequence which will be described in FIG. 8.

Upon detection of the frame sync signal, the sync signal detector 106 outputs a sync signal detection signal $S_6$ (see FIG. 8) to the bit synchronization circuit 105, a frame counter section 108, and the decoder 109, and also generates an interruption $S_3$ of sync signal detection to the CPU 111. Upon reception of the sync signal detection signal $S_6$, the bit synchronization circuit 105 generates a first-bit signal 5, in which a pulse of 1-bit width occurs at the head of each word (=30 bits) at the timing as shown in FIG. 8, and supplies it to the frame counter section 108.

The decoder 109 receives, from the CPU 111, a self calling number that is previously stored in an ID-ROM 118. After receiving the sync signal detection signal $S_6$, the decoder 109 cuts out a bit sequence from the received signal $S_1$ coming from the radio receiver 104 by using the bit-corrected clock signals $S_8$ that are supplied from the bit synchronization circuit 105, and performs an error detection and correction operation on the bit sequence on a word-by-word basis (1 word=30 bits). In processing reception data having an ID number code and a message code (see FIG. 6), the decoder 109 performs, in addition to the error detection and correction, detection of a self calling number that is received from the CPU 111 and detection of a fixed pattern such as a message termination signal from the received signal $S_1$. Further, the decoder 109 outputs, to the CPU 111, an error detection result and error-corrected data (information bit), and detection results of the self calling number and the fixed pattern.

The CPU 111 fetches a program that is previously stored in a ROM 116 via an address bus and a data bus, and operates according to the program while using a RAM 117. As described later, the RAM 117 is used to retain calculated frame information values including a calculated ideal frame information value and a predicted frame information value.

Figure 4:
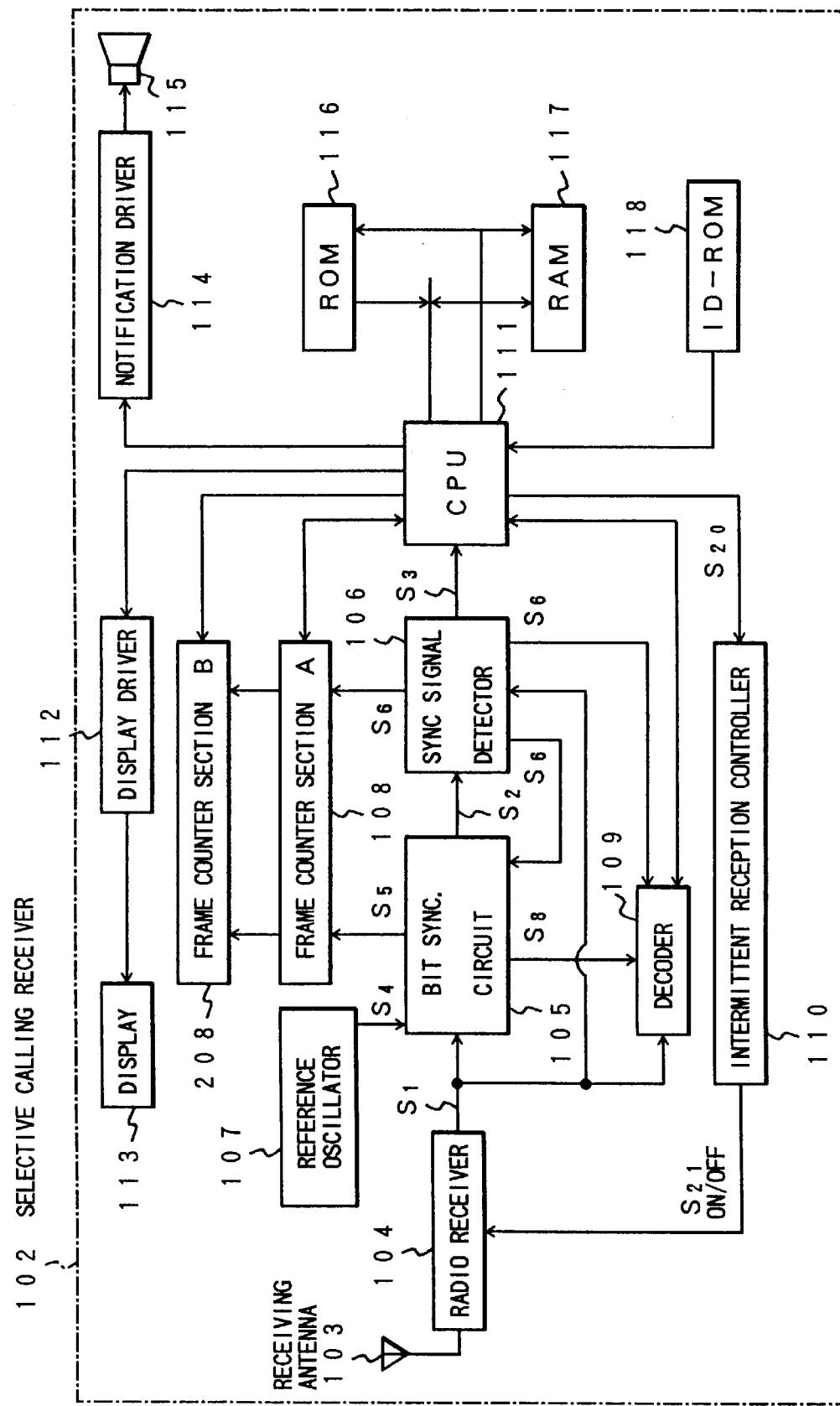
FIG. 4 is a block diagram showing another example of a wireless selective calling receiver to implement the present invention.

Referring to FIG. 4, another selective calling receiver 102 according to the present invention is further provided with two frame counter sections 108 and 208 which are used to set the intermittent receiving timing as described later. The frame counter sections 108 and 208 have the same circuit as the frame as described in FIG. 5. Other circuit blocks similar to those previously described with reference to FIG. 3 are denoted by the same reference numerals and the description will be omitted.

Figure 5:
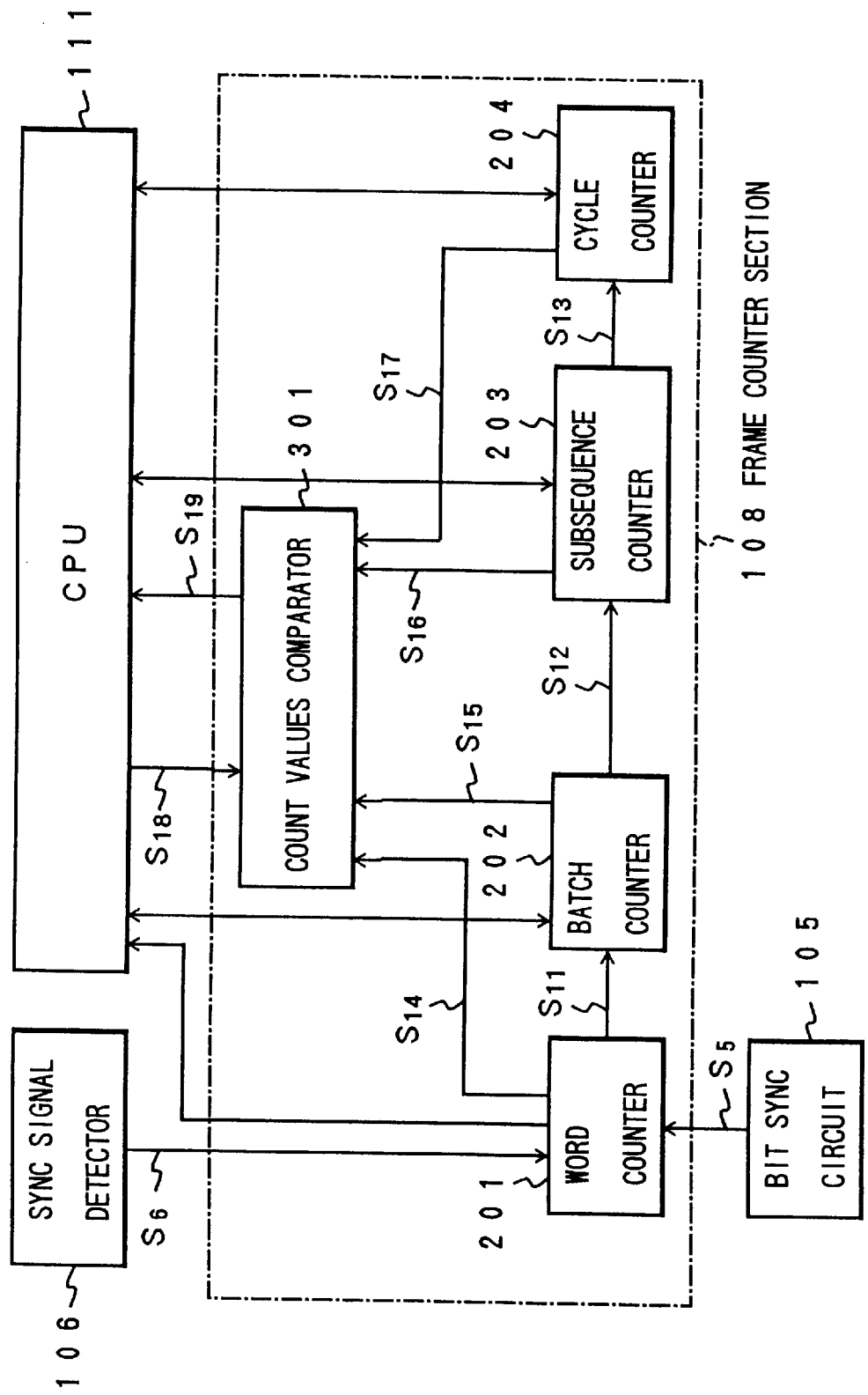
FIG. 5 is a block diagram showing an internal configuration of an example of a frame counter section used in the wireless selective calling receiver of FIGS. 3 and 4.
Figure 6:
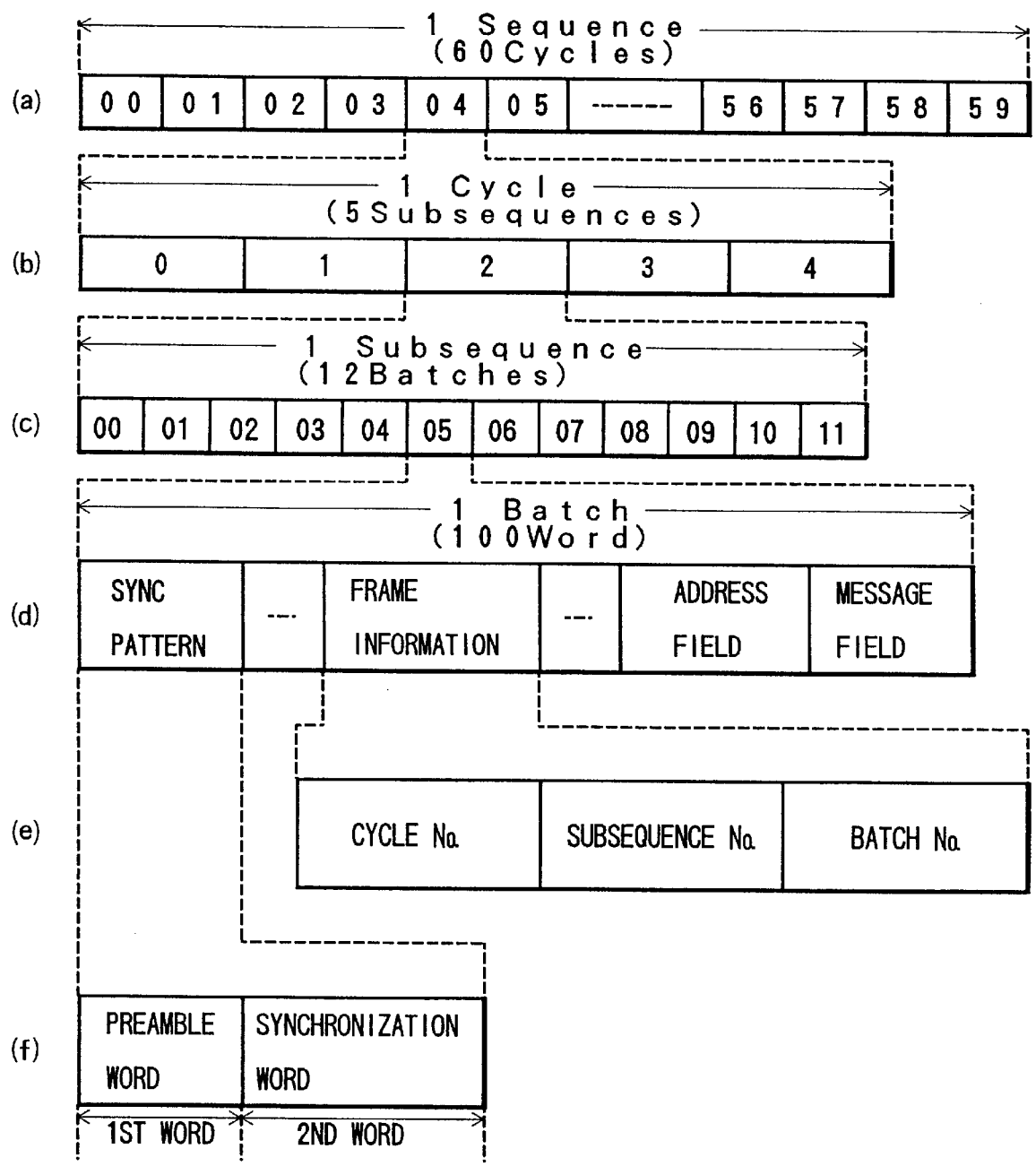
FIG. 6 shows an example of a format of a synchronization signal scheme for a signal to be received by the wireless selective calling receiver of the invention.

Referring to FIG. 5, the frame counter section 108 is comprised of a word counter 201, a batch counter 202, a subsequence counter 203, and a cycle counter 204 which are set by the CPU 111 and count the respective numbers of words, batches, subsequences, and cycles as shown in FIG. 6. Further a comparator 301 compares the respective count values of these counters with values preset by the CPU 111 through a signal $S_{18}$ and outputs the comparison result to the CPU 111 through an interruption signal $S_{19}$.

In the cases of the signal format as shown in FIG. 6, these counters operate as follows. The word counter 201 increments according to the first-bit pulse signal $S_5$ received from the bit synchronization circuit 105. When the word count value reaches 99, it is returned to 0 upon reception of the next pulse of the first-bit pulse signal $S_5$. The batch counter 202 counts up in response to a pulse $S_{11}$ that is generated when the count of the word counter 201 returns from 99 to 0. When the count of the batch counter 202 reaches 11, it is returned to 0 upon reception of the next pulse. The subsequence counter 203 counts up in response to a pulse S12 that is generated when the count of the batch counter 202 returns from 11 to 0. When the count of the subsequence counter 203 reaches 4, it is returned to 0 upon reception of the next pulse. Further, the cycle counter 204 counts up in response to a pulse $S_{13}$ that is generated when the count of the subsequence counter 203 returns from 4 to 0. When the count of the cycle counter 204 reaches 59, it is returned to 0 upon reception of the next pulse.

Referring to FIG. 6, the base station 101 transmits a transmission signal having the following format through a plurality of frequency channels in synchronization. One sequence consists of 60 cycles each cycle consisting of 5 subsequences, which are shown in (a) and (b) of the figure. Each subsequence consists of 12 batches each batch consisting of 100 words, which are shown in (c) and (d) of the figure. Each batch includes a synchronization pattern, frame information, an address field, and a message field. The frame information signal includes a cycle number, a subsequence number, and a batch number as shown in (e) of the figure. In other words, the frame information identifies the position of that frame. The synchronization pattern includes a preamble word and a synchronization word as shown in (f) of the figure. Such a transmission signal is transmitted through each of frequency channels in synchronization.

Referring to FIGS. 7A and 7B, the bit synchronization circuit 105 performs the bit correction of the internal symbol-rate clock signal and the internal bit-rate clock signal by using the preamble word and the synchronization word of the received signal. FIG. 7A shows a case where the phase of an internal symbol-rate clock signal in advanced from a transmitted signal by ¼ of the symbol width, and FIG. 7B shows a case where the former is delayed from the latter by ¼ of the symbol width.

Referring to FIG. 8, the sync signal detector 106 generates the sync detection signal $S_6$ based on the bit-corrected clock signals and the bit synchronization circuit 105 generates the first-bit signal $S_5$ based on the sync detection signal $S_6$.

Figure 9:
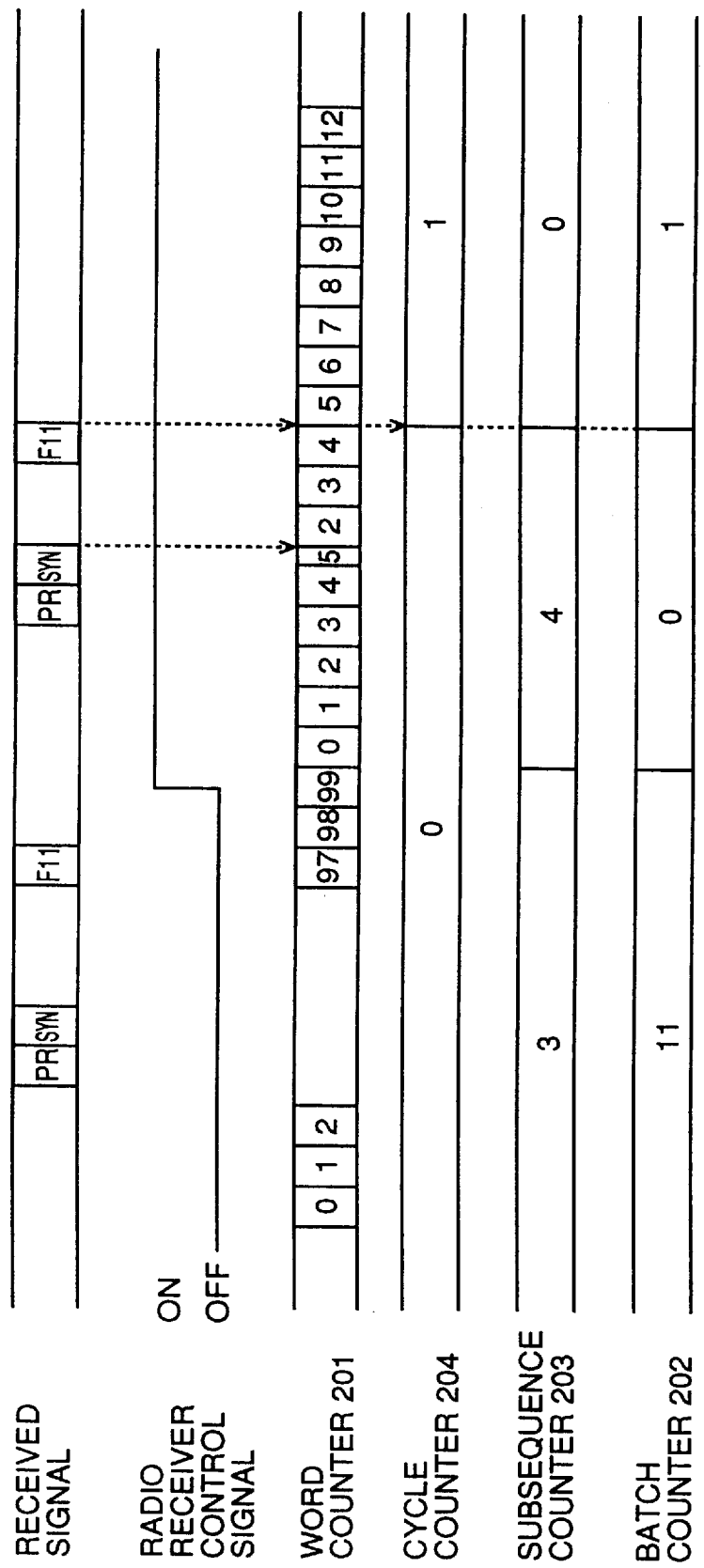
FIG. 9 is a timing chart showing an example of a intermittent receiving operation for pulling into synchronization.

Referring to FIG. 9, the word counter 201 increments according to the first-bit pulse signal $S_5$. When the word count value reaches 99, it is returned to 0 upon reception of the next pulse of the first-bit pulse signal $S_5$. The batch counter 202 counts up when the count of the word counter 201 returns from 99 to 0. When the count of the batch counter 202 reaches 11, it is returned to 0 upon reception of the next pulse. The subsequence counter 203 counts up when the count of the batch counter 202 returns from 11 to 0. When the count of the subsequence counter 203 reaches 4, it is returned to 0 upon reception of the next pulse. Further, the cycle counter 204 counts up when the count of the subsequence counter 203 returns from 4 to 0. When the count of the cycle counter 204 reaches 59, it is returned to 0 upon reception of the next pulse. In this manner, a frame is identified by frame information comprising a combination of the respective counter values of the batch counter 202, the subsequence counter 203, and the cycle counter 204.

As described before, the CPU 111 fetches the program to from the ROM 116, and then performs the receiving operations according to the program. The main contents of the program for receiving the transmission signal conforming to the signal format shown in FIG. 6 will be described below.

1) Before Frame Synchronization Establishment

During a pull-in-sync operation, when the CPU 111 receives an interruption of sync signal detection from the sync signal detector 106, the CPU 111 then receives data relating to the frame information of the received signal from the decoder 109.

If there is no problem in the error detection result of the frame information received from the decoder 109, the CPU 111 performs a range check on the frame information. If there is no problem again, the CPU 111 sets the frame counter section 108 based on the frame information concerned as shown in FIG. 9, which shows an example of an operation for synchronizing the internal frame counter section with the received frame by receiving frame information following the frame sync signal in a case where the frame counter is out of synchronization with the received frame.

Upon setting the frame counter section 108 based on the frame information, the CPU 111 calculates a next ideal frame value of frame information which should be received at the next receiving time and stores the calculated ideal frame value into the RAM 117. After that, the intermittent receiving operation is performed in the frame synchronization state by the intermittent reception controller 110 controlling the radio receiver 104 through the intermittent control signal $S_{21}$ so as to receive frames only at predetermined timing under the control of the CPU 111.

2) Frame Synchronization Establishment

During the frame synchronization establishment state, the CPU 111 reads the previously set frame information from the ID-ROM 118, and controls the intermittent reception controller 110 based on the read-out information so that the radio receiver 104 is turned on with a certain margin, i.e., somewhat before the frame to be received (usually, frames are grouped so as to be associated with respective batches). For example, if the CPU 111 sets values indicating "the 95th word in the batch immediately preceding the batch to be received" for the comparator 205 (see FIG. 5), the comparator 205 generates an interruption to the CPU 111 through a signal $S_{19}$ when all the count values $S_{14}$–$S_{17}$ coincide with the set values. Upon reception of this interruption, the CPU 111 controls the intermittent reception controller 110 to turn on the radio receiver 104.

3) After Frame Synchronization Establishment

When the CPU 111 receives an interruption of sync signal detection in the frame to be received while causing the radio receiver 104 to perform the intermittent receiving operation in the frame synchronization state, it then receives data relating to the frame information from the decoder 109. If there is no problem in the error detection and range check results of the frame information, the frame comparison of the received frame with the calculated ideal frame value stored in the RAM 117 and the calculation of a next ideal and predicted frame values are performed. This operation and the subsequent operations of the receiver will be described later in detail, because they constitute the features of the invention.

Further, when the CPU 111 is informed of detection of the self calling number from the decoder 109 while processing reception data of the ID number code, it then receives the corresponding message data from the decoder 109 and stores it into the RAM 117 after subjecting it to predetermined character conversion. The CPU 111 also controls a notification driver 114 to cause a speaker 115 to generate sound (i.e., effect notification) and, at the same time, controls a display driver 112 to display the received message.

INTERMITTENT RECEIVING METHODS

Figure 15:
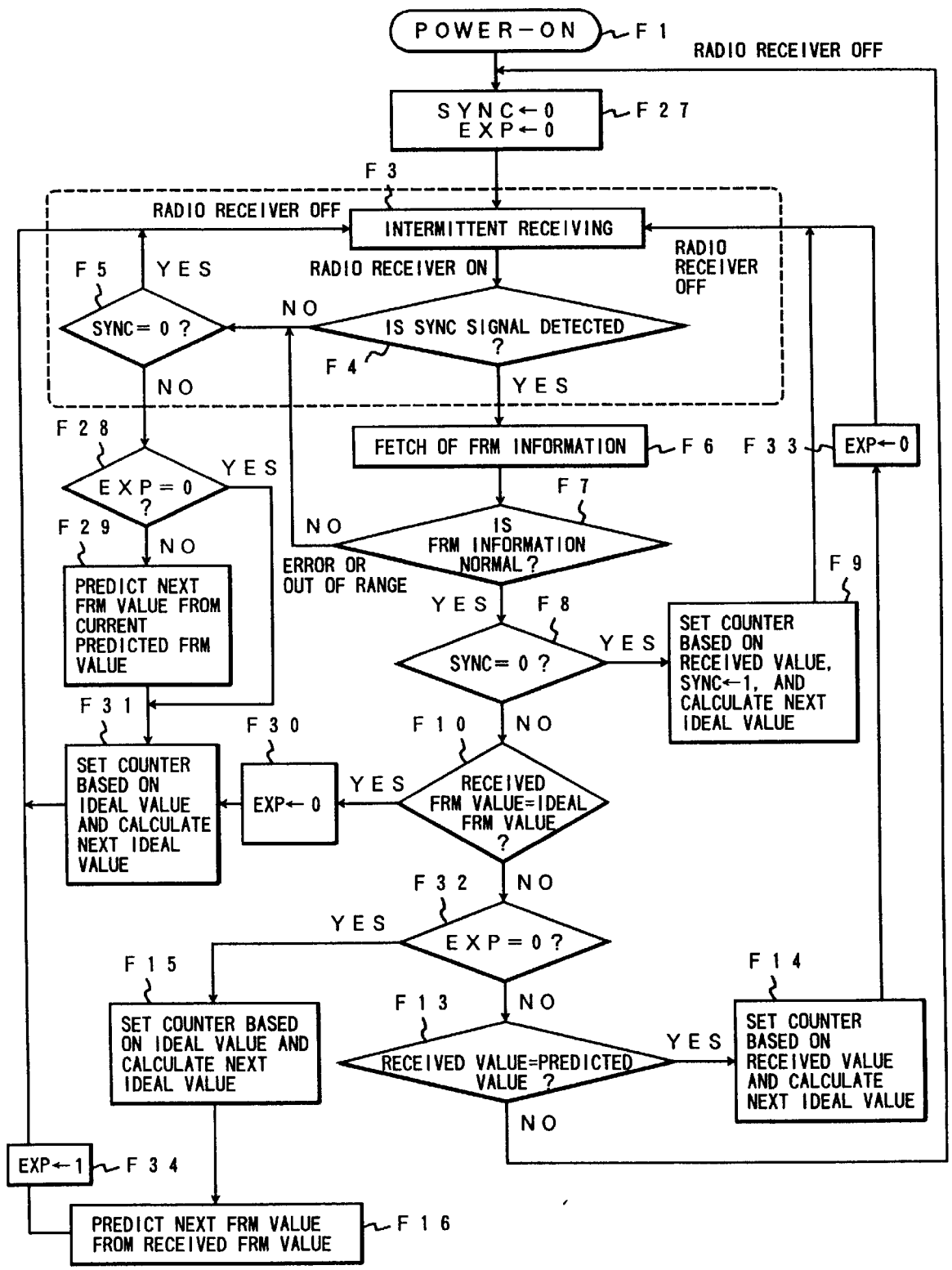
FIG. 15 is a flowchart showing a process flow according to a fifth embodiment of the invention in the wireless selective calling receiver of FIG. 3.
Figure 16:
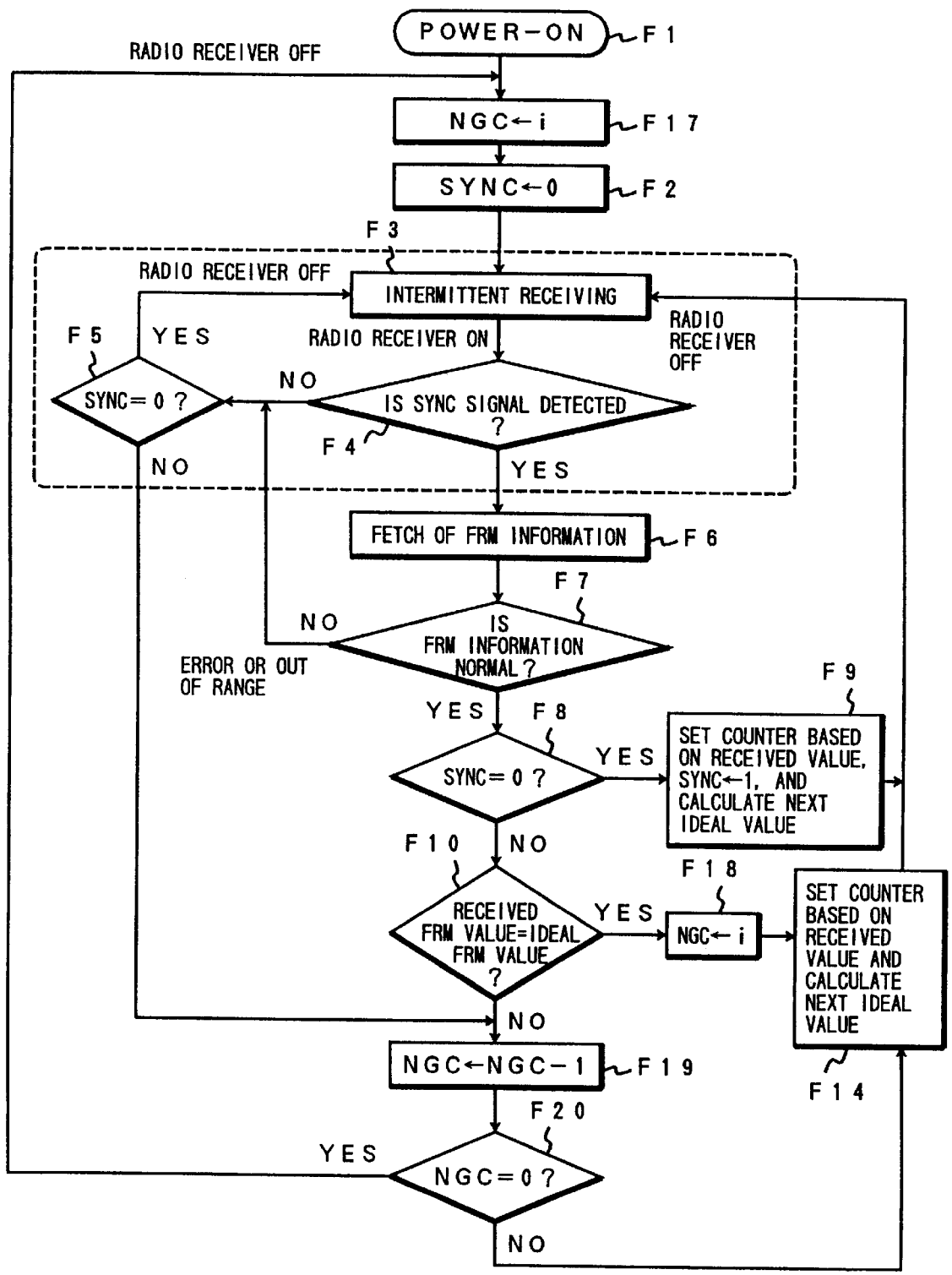
FIG. 16 is a flowchart showing a process flow according to a sixth embodiment of the invention in the wireless selective calling receiver of FIG. 3.
Figure 17:
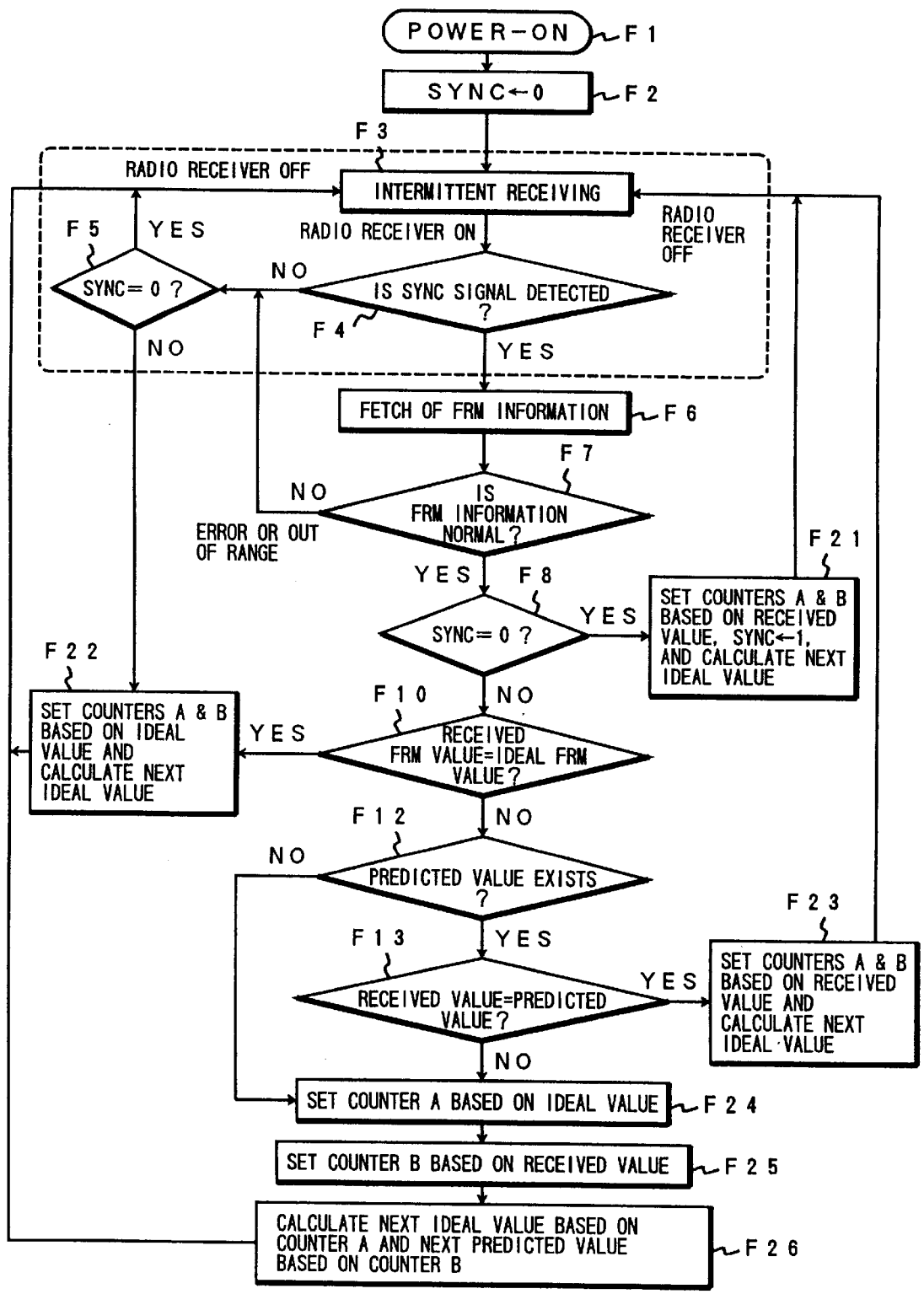
FIG. 17 is a flowchart showing a process flow according to a seventh embodiment of the invention in the wireless selective calling receiver of FIG. 4.
Figure 18:
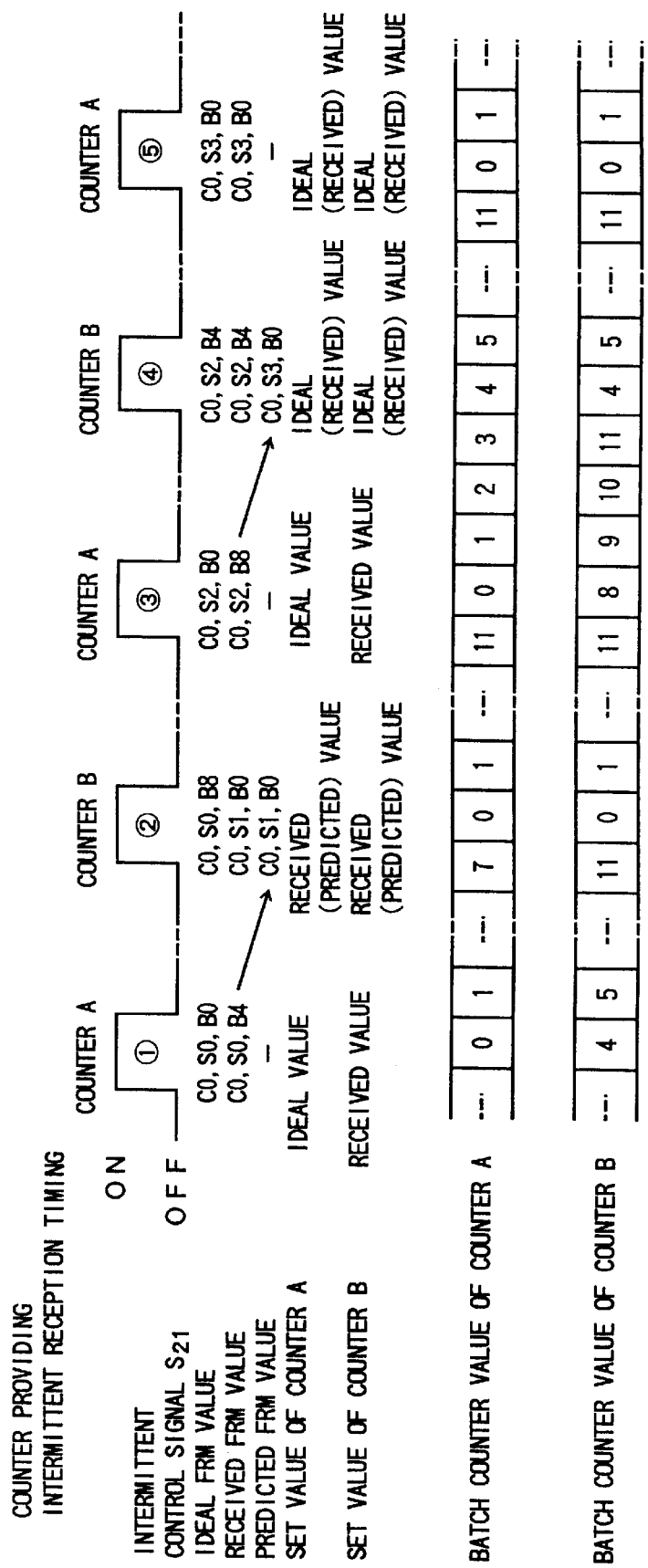
FIG. 18 is a time chart showing changes of an ideal frame value, a received frame value, a predicted frame value, and counter values of counter A and B according to the seventh embodiment of the invention as shown in FIG. 17.
Figure 19:
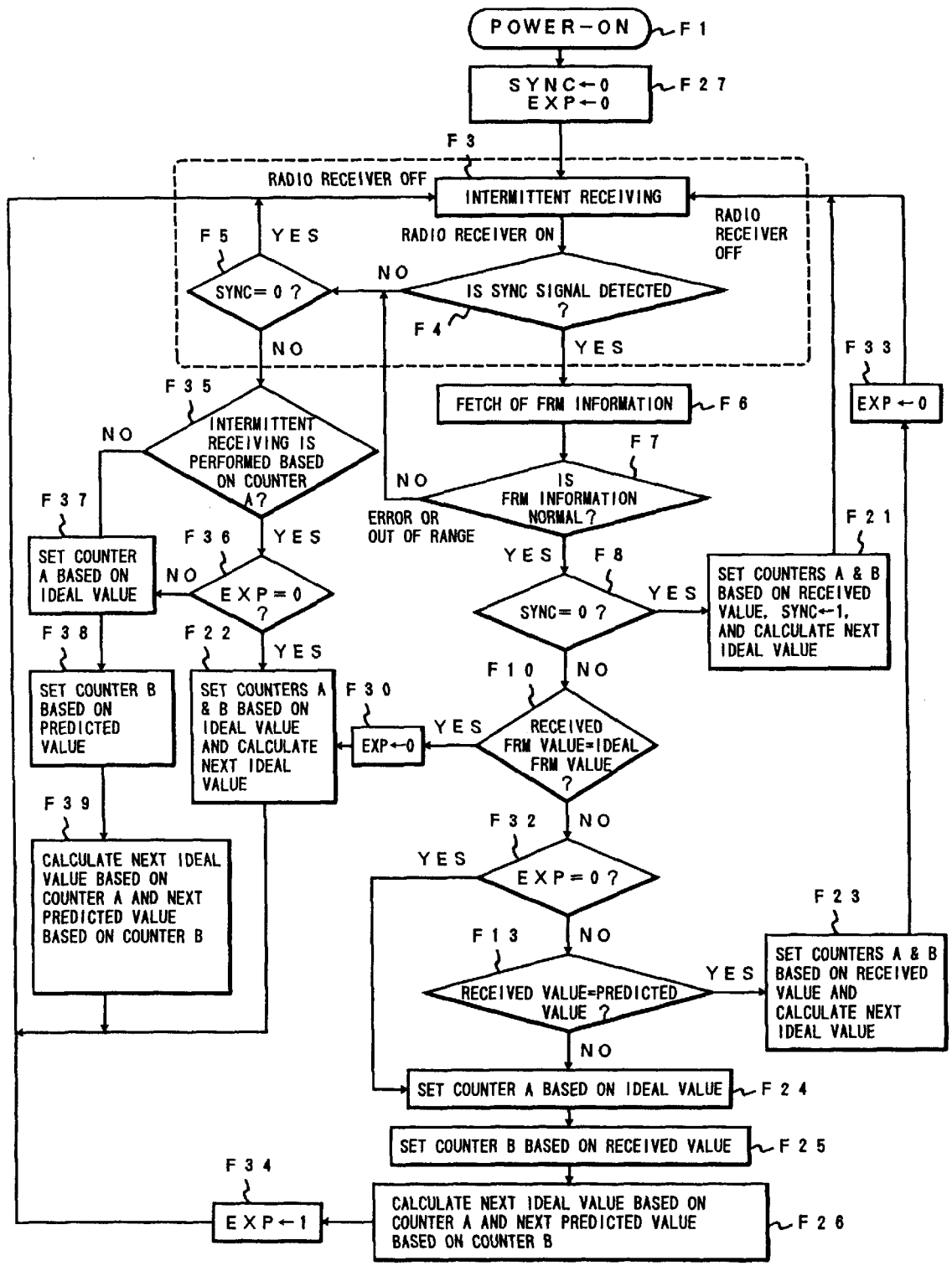
FIG. 19 is a flowchart showing a process flow according to an eighth embodiment of the invention in the wireless selective calling receiver of FIG. 4.

FIGS. 10–16 show respective receiving methods according to six embodiments of the present invention and FIGS. 17–19 show respective receiving methods according to more two embodiments of the present invention. Each of these process flows is executed by the CPU 111, and its program is stored in the ROM 116.

FIRST EMBODIMENT

Figure 10:
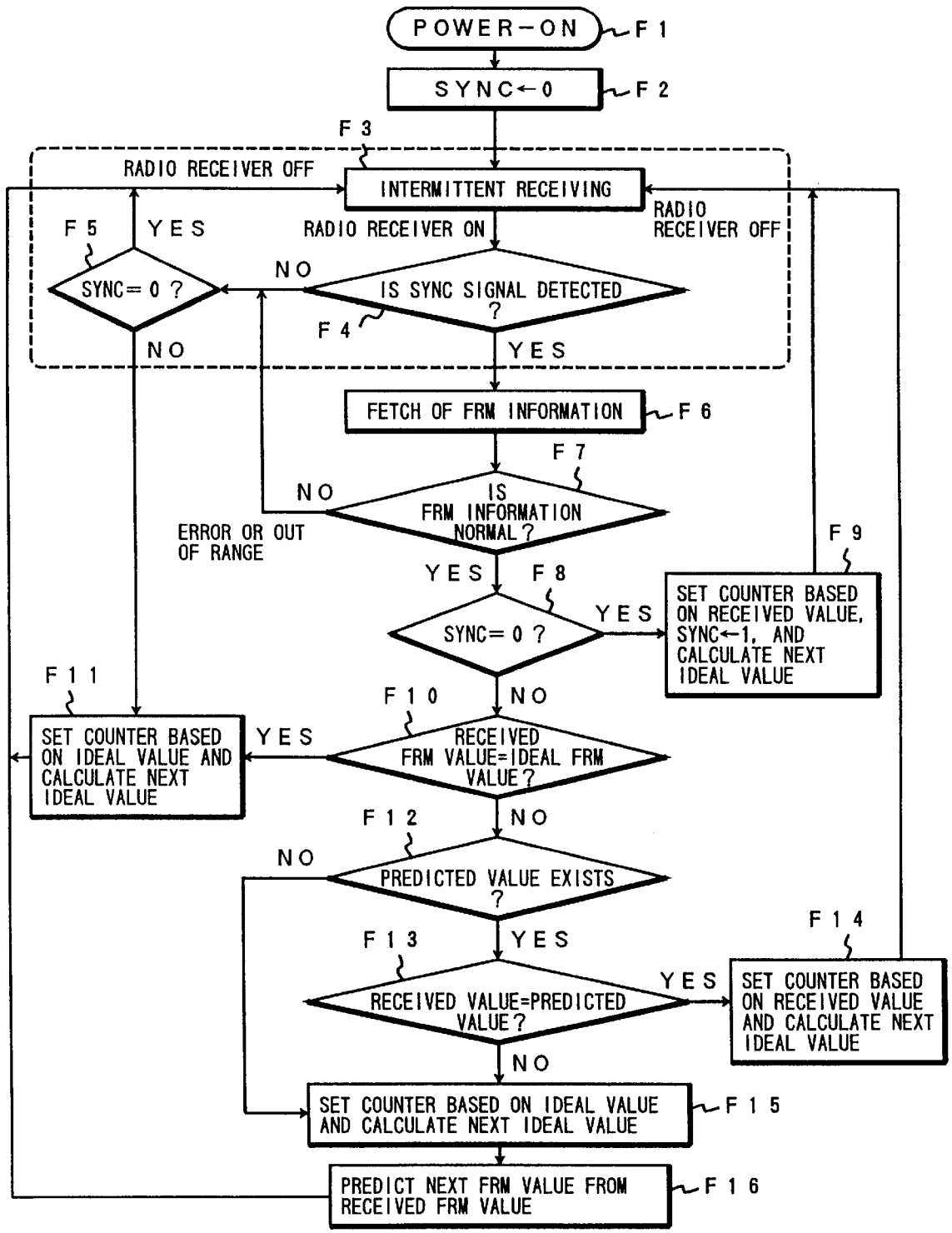
FIG. 10 is a flowchart showing a process flow according to a first embodiment of the invention in the wireless selective calling receiver of FIG. 3.

Referring to FIG. 10, after the power-on (step F1), a frame sync flag SYNC is set at 0, which indicates a non-synchronization state (step F2). Then, the intermittent receiving operation (step F3) is started for pulling into synchronization. If the frame sync signal is detected (Yes at step F4) during this operation for pulling into synchronization, ensuing transmission frame information is fetched (step F6) and then the fetched frame information is checked to find an error and a range (step F7). If the fetched frame information is found erroneous or out of range (No at step F7), the above operation is performed again from the pulling into synchronization because the frame sync flag SYNC is 0 at this receiving timing.

If the fetched frame information is not found erroneous nor out of range (Yes at step F7), then it is checked whether SYCH=0 (step F8), and the step F9 is performed. In the step F9, the frame sync flag SYNC is set at 1 (synchronization state), the frame counter section 108 is set based on the received frame information value, and a next ideal frame information value which should be received at the next receiving timing is calculated.

After the frame sync flag SYNC is set at 1 and the frame counter section 108 is set based on the received frame information value (step F9), the intermittent receiving operation (step F3) is performed in the established frame synchronization state to effect reception only in the frame to be received in accordance with the set values of the frame counter section 108.

During the intermittent receiving operation after the frame synchronization establishment, if the frame sync signal is not detected (No at step F4) or if the frame sync signal is detected (Yes at step F4) but fetched frame information is not normal (No at step F7), since the SYNC=1 (No at step F5), the step F11 is performed. In the step F11, the frame counter section 108 is set based on the ideal frame value which exists at this receiving timing and a next ideal frame value which should be received at the next receiving timing is calculated. After that, the intermittent receiving operation (step F3) is performed in the established frame synchronization state in accordance with the set values of the frame counter section 108.

If the received frame information is normal (Yes at step F7.), since SYNC=1, it is checked whether the received frame value is coincident with the ideal frame value (step F10). If they are identical (Yes at step F10), the frame counter section 108 is set based on the ideal frame value which is now identical to the received frame value and a next ideal frame value which should be received at the next receiving timing is calculated (step F11).

On the other hand, if the received frame value is different from the ideal frame value (No at step F10), it is checked whether a predicted frame value exists (step F12). When a predicted frame value exists (Yes at step F12), it is further checked whether the received frame value is coincident with the predicted frame value (step F13). If the received frame value is coincident with the predicted frame value (Yes at step F13), then the step F14 is performed. In the step F14, the frame counter section 108 is set based on the received frame value and a next ideal frame value which should be received at the next receiving timing is calculated based on the received frame value. After that, the intermittent receiving operation (step F3) is performed in the established frame synchronization state in accordance with the set values of the frame counter section 108.

If the received frame value is different from the predicted frame value (No at step F13) or no predicted frame value exists (No at step F12), then the step F15 is performed. In the step F15, the frame counter section 108 is set based on the ideal frame value which exists at this receiving timing and a next ideal frame value which should be received at the next receiving timing is calculated.

Subsequently, the step F16 is performed. In the step F16, based on the received frame value, a next predicted frame value is calculated which should be received at the next receiving timing in the case where the received frame information is correct. After that, the intermittent receiving operation (step F3) is performed in the established frame synchronization state in accordance with the set values of the frame counter section 108 which was set in the step F15.

The intermittent receiving operation after the frame synchronization establishment will be more specifically described hereinafter referring to FIGS. 1A–11C. Note that FIG. 11D shows a case of the fourth embodiment as described later.

Figure 11A:
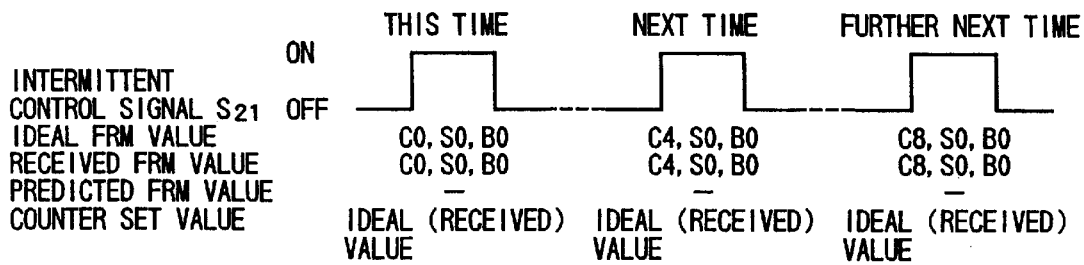
FIG. 11A is a time chart showing changes of an ideal frame valve, a received frame value, and a predicted frame value according to the first embodiment of the invention in a case where the received frame value is coincident with the ideal frame value at each time.

FIG. 11A shows a case where a received frame value is coincident with an ideal frame value at each intermittent receiving timing. A received frame value is coincident with the ideal frame value at each receiving timing (Yes at step F10). Therefore, the frame counter section 108 in set based on the current ideal frame value and a next ideal frame value which should be received at the next receiving timing is calculated (step F11) but a next predicted frame value is not calculated.

Figure 11B:
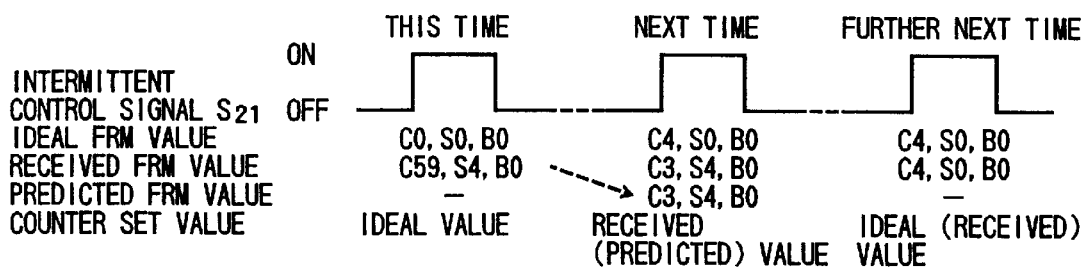
FIG. 11B is a time chart showing changes of an ideal frame value, a received frame value, and a predicted frame value according to the first embodiment of the invention in a case where the received frame value is not coincident with the ideal frame value at a first receiving time, the received frame value is coincident with the predicted frame value at a second receiving time, and the received frame value is coincident with the ideal frame value at a third receiving time.

In a case as shown in FIG. 11B, at this receiving timing, the received frame value is different from the ideal frame value (No at step F1) and no predicted frame value exists (No at step F12). Therefore, the frame counter section 108 is set based on the ideal frame value (C0, S0, B0) which exists at this receiving timing and a next predicted frame value (C3, S4, B0) is calculated which should be received at the next receiving timing in the case where the received frame information (C59, S4, B0) is correct. At the next receiving time, it a received frame value (C3, S4, B0) is not coincident with an ideal frame value (C4, S0, B0) but the predicted frame value (C3, S4, B0) (No at step F10, Yes at step F13), the frame counter section 108 is set based on the received frame value, that is, the predicted frame value (C3, S4, B0), and a next ideal frame value (C4, S0, B0) which should be received at the next receiving timing is calculated based on the received frame value. However, a next predicted frame value is not calculated because the received frame value is coincident with the predicted frame value (Yes at step F13). If a received frame value (C4, S0, B0) is coincident with an ideal frame value (C4, S0, B0) at the further next receiving timing, it is the same with the steps as shown in FIG. 11A.

Figure 11C:
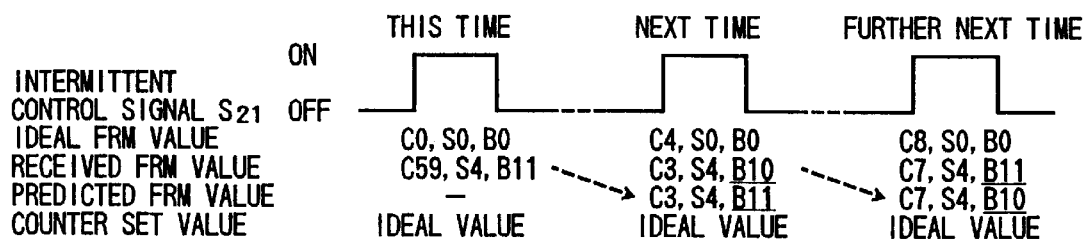
FIG. 11C is a time chart showing changes of an ideal frame value, a received frame value, and a predicted frame value according to the first embodiment of the invention in a case where any two frame values are not coincident with each other at each receiving time.
Figure 11D:
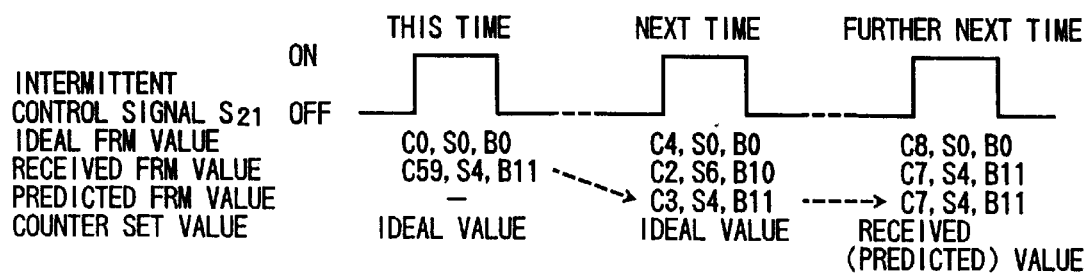
FIG. 11D is a time chart showing changes of an ideal frame value, a received frame value, and a predicted frame value according to a fourth embodiment of the invention in a case where a next predicted frame value is calculated using a preceding predicted frame value.

In a case as shown in FIG. 11C, at this receiving timing, the received frame value is different from the ideal frame value (No at step F10) and no predicted frame value exists (No at step F12). Therefore, the frame counter section 108 is set based on the ideal frame value (C0, S0, B0) which exists at this receiving timing and a next predicted frame value (C3, S4, B11) is calculated which should be received at the next receiving timing in the case where the received frame information (C59, S4, B11) is correct. At the next receiving time, if a received frame value (C3, S4, B10) is neither coincident with an ideal frame value (C4, S0, B0) nor the predicted frame value (C3, S4, B11) (No at step F10, No at step F13), the frame counter section 108 is set based on the ideal frame value (C4, S0, B0), and a next ideal frame value (C8, S0, B0) which should be received at the next receiving timing and a next predicted frame value (C7, S4, B10) are calculated (steps F15 and F16). If a received frame value (C7, S4, B11) is neither coincident with an ideal frame value (C8, S0, B0) nor the predicted frame value (C7, S4, B10) at the further next receiving timing, the same steps are repeated.

SECOND EMBODIMENT

In the second embodiment, if a received frame value is not coincident with a predicted frame value which was calculated at the preceding receiving timing, then neither the counter setting nor the prediction of a next frame value is performed but the intermittent receiving for pulling into synchronization after the synchronization establishment is canceled.

Figure 12:
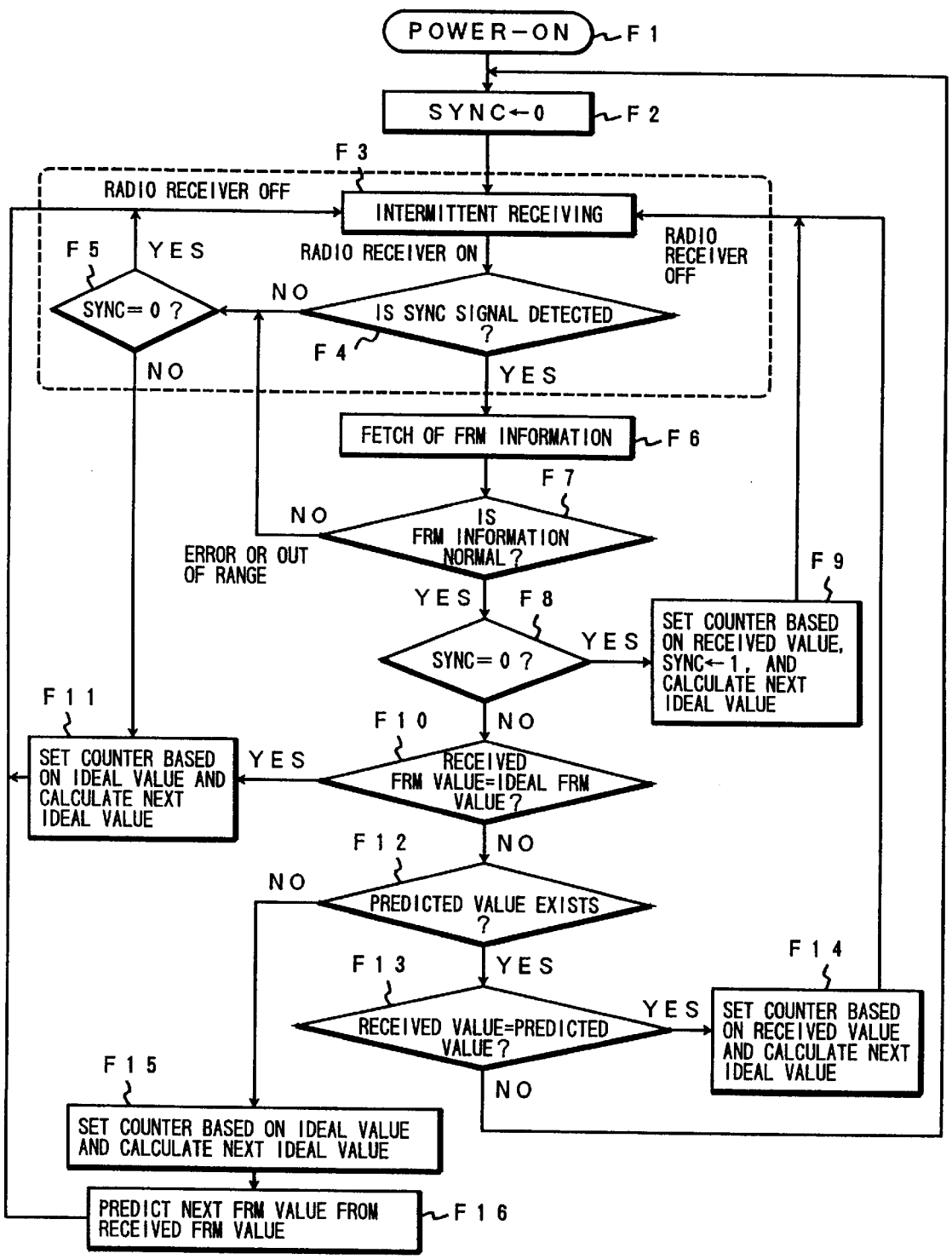
FIG. 12 is a flowchart showing a process flow according to a second embodiment of the invention in the wireless selective calling receiver of FIG. 3.

Referring to FIG. 12, the process flow thereof is different from that of FIG. 10 in the following point. That is, if the received frame value is different from the ideal frame value (No at step F10) and a predicted frame value exists (Yes at step F12), it is further checked whether the received frame value is coincident with the predicted frame value (step F13). If the received frame value is coincident with the predicted frame value (Yes at step F13), then the step F14 is performed as described in FIG. 11. However, if the received frame value is different from the predicted frame value (No at step F13), control goes back to the step F2 where the SYNC is reset to 0 and then the intermittent receiving for pulling into synchronization is performed again. In other words, in a case where the received frame value is different from both the ideal frame value and the predicted frame value, the established synchronization is canceled and control is back to the intermittent receiving for pulling into synchronization.

THIRD EMBODIMENT

In the third embodiment, the prediction of next frame value is not performed. The intermittent receiving for pulling into synchronization is started again when the number of consecutive non-coincidence times that a received frame value is not coincident with an ideal frame value reaches a preset allowable value.

Figure 13:
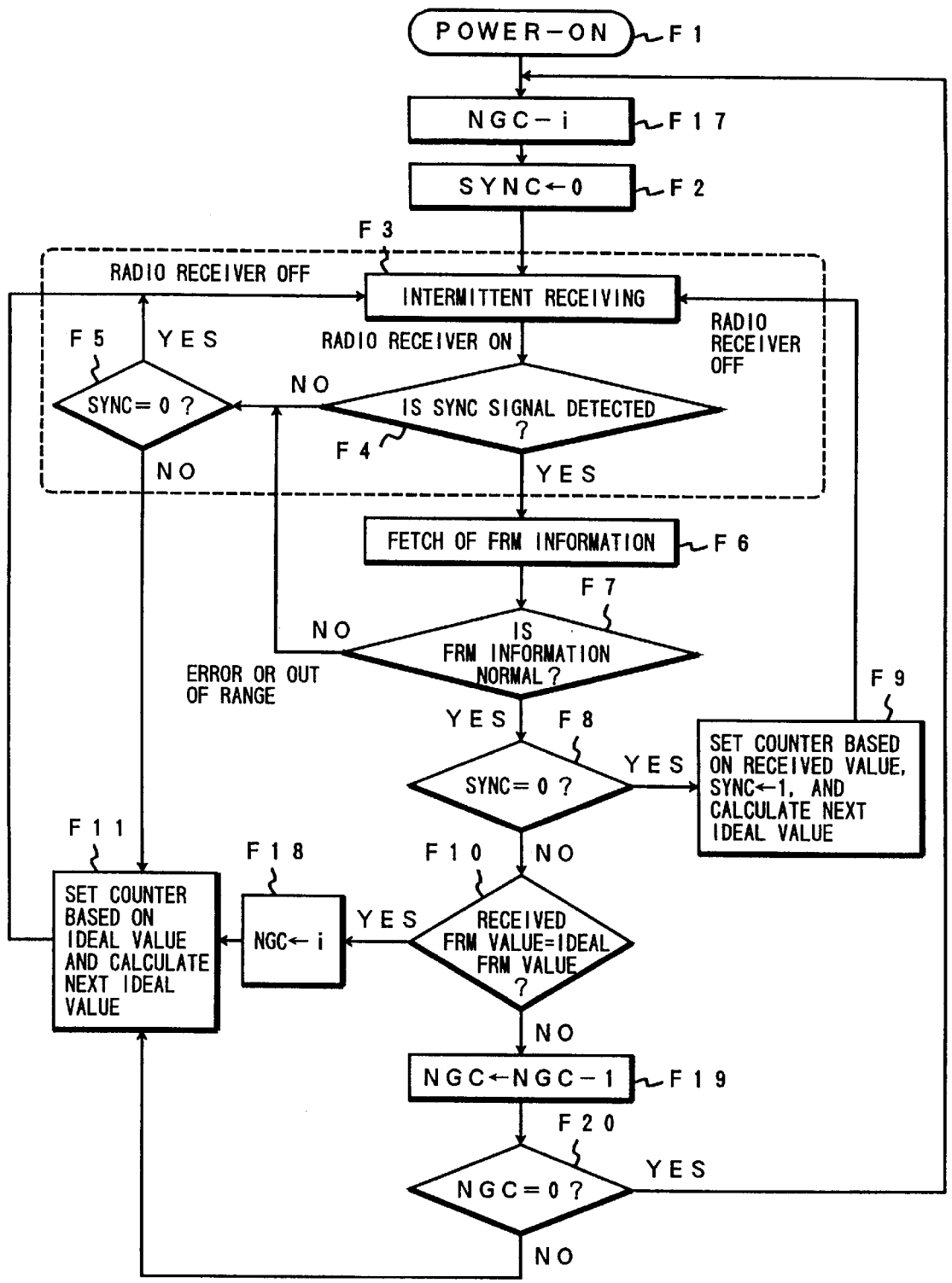
FIG. 13 is a flowchart showing a process flow according to a third embodiment of the invention in the wireless selective calling receiver of FIG. 3.

Referring to FIG. 13, the process flow thereof is different from that of FIG. 12 in the following point. That is, after power-on (step F1), the number of times a received frame value is not coincident with an ideal frame value (hereinafter called a non-coincidence number NGC) is set to a predetermined integer number i (step F17). If the received frame value is coincident with the ideal frame value (Yes at step F10), the non-coincidence number NGC is initialized (step F18) and the step F11 is performed, as described before, where the frame counter section 108 is set based on the ideal frame value which exists at this receiving timing and a next ideal frame value which should be received at the next receiving timing is calculated. Based on the set values of the frame counter section 108, the intermittent receiving timing is determined.

It the received frame value is different from the ideal frame value (No at step F10), the non-coincidence number NGC is decremented (step F19) and the step F11 and the subsequent steps as described before are performed until the non-coincidence number NGC becomes 0 (F20). When the non-coincidence number NGC becomes 0 (Yes at step F20), control goes back to the initializing steps F17 and F2 where the NGC is reset to i and the SYNC is reset to 0, and then the intermittent receiving for pulling into synchronization is performed again. In other words, in a case where non-coincidence of a received frame value and an ideal frame value occurs consecutively at the predetermined number of times, the established synchronization is canceled and control is back to the intermittent receiving for pulling into synchronization.

The above methods of the second and third embodiments are suitable for a receiving scheme in which a receiving channel is locked to a channel of higher sensitivity by scanning a plurality of channels, which are predetermined in a system, at the time of pulling into synchronization.

Further, in a case where the synchronization is established when coincidence of a received frame value and an ideal frame value occurs consecutively at the predetermined number of times, the possibility of setting the frame counter section 108 to erroneous values at the time of synchronization establishment is thought to be very small. Therefore, the above methods are also suitable for such a case. That is, it is preferable to cancel the synchronization establishment and start the sync pull-in operation when the received frame value is different from both the ideal frame value and the predicted frame value or when non-coincidence of a received frame value and an ideal frame value occurs consecutively at the predetermined number of times.

FOURTH EMBODIMENT

In the fourth embodiment, when the sync signal fails to be detected or when a fetched frame information is not normal in the synchronization establishment state, if a predicted frame value exists, a next predicted frame value is calculated based on the existing predicted frame value.

Figure 14:
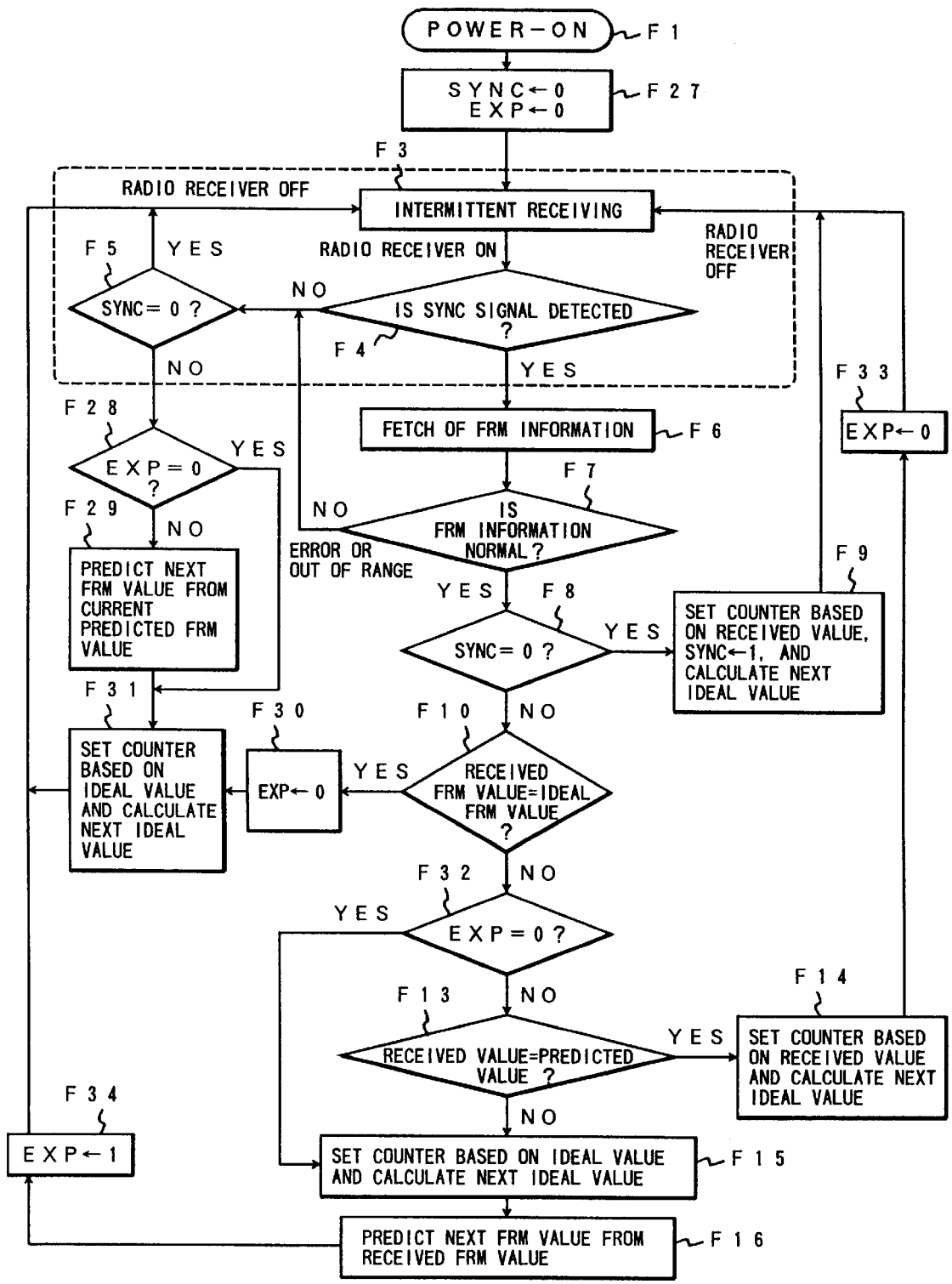
FIG. 14 is a flowchart showing a process flow according to the fourth embodiment of the invention in the wireless selective calling receiver of FIG. 3.

Referring to FIG. 14, the process flow thereof is different from that of FIG. 10 in the following point. That is, after power-on (step F1), a frame sync flag SYNC and a predicted value flag EXP indicating the presence or absence of a predicted value are both initialized (step F27).

If the received frame value is different from the ideal frame value (No at step F10), it is checked whether EXP=0, that is, a predicted frame value exists (step F32). When EXP=1, or a predicted frame value exists (No at step F32), it is further checked whether the received frame value is coincident with the predicted frame value (step F13). If the received frame value is coincident with the predicted frame value (Yes at step F13), then the step F14 is performed as described before, and EXP is reset to 0 (step F33). On the other hand, if the received frame value is different from the predicted frame value (No at step F13) or if no predicted frame value exists (Yes at step F32), then the step F15 and then the step F16 are performed. In the step F16, as described before, a next predicted frame value is calculated based on the received frame value. After that, EXP is set to 1 (step F34) and then the intermittent receiving operation (step F3) is performed in the established frame synchronization state in accordance with the set values of the frame counter section 108 which was set in the step F15.

In the synchronization establishment state (SYNC=1), when the sync signal fails to be detected (No at step F4) or when a received frame information is not normal (No at step F7), it is further checked whether EXP-0 (step F28). If EXP=1, that is, a predicted frame value exists (No at step F28), a next predicted frame value is calculated using the existing predicted frame value (step F29). When the next predicted frame value has been calculated or EXP=0, the frame counter section 108 is set based on the ideal frame value and a next ideal frame value which should be received at the next receiving timing is calculated (step F31). When the received frame value is identical to the ideal frame value (Yes at step F10), the step F31 is also performed after and EXP is reset to 0 (step F30). The operation of the fourth embodiment will be more specifically described hereinafter referring to FIG. 11D.

As shown in FIG. 11D, at this receiving timing, a received frame value (C59, S4, B11) is different from an ideal frame value (C0, S0, D0) (No at step F10) and no predicted frame value exists (Yes at step F32). Therefore, the frame counter section 108 is set based on the ideal frame value and a next ideal frame value (C4, S0, B0) is calculated (step F15), a next predicted frame value (C3, S4, B11) is calculated based on the received frame information (C59, S4, B11) and stored into the RAM 117 (step F16), and then EXP is set to 1 (step F34).

At the next receiving time, if a fetched frame value is out of the predetermined range (No at step F7), since both SYNC and EXP are 1 (No at steps F5 and F28), the step F29 is performed. More specifically, a further next predicted frame value (C7, S4, B11) which will be received at the further next receiving timing is calculated based on the predicted frame value (C3, S4, B11). And, the frame counter section 108 is set based on the ideal frame value (C4, S0, B0) and a further next ideal frame value (C8, S0, B0) which should be received at the further next receiving timing is calculated.

At the further next receiving timing, if a normally received frame value (C7, S4, E11) is not coincident with the ideal frame value (C8, S0, B0) but the predicted frame value (C7, S4, B11) at the further next receiving timing (No at step F10 and Yes at step F13), the frame counter section 108 is set based on the received frame value (C7, S4, B11) and a next ideal frame value is calculated as described before (step F14).

FIFTH EMBODIMENT

In the fifth embodiment, when the sync signal fails to be detected or a fetched frame information is not normal in the synchronization establishment state, if a predicted a frame value exists, a next predicted frame value is calculated based on the existing predicted frame value. In addition, if a received frame value is not coincident with a predicted frame value which was calculated at the preceding receiving timing, then neither the counter setting nor the prediction of a next frame value is performed but the intermittent receiving for pulling into synchronization after the synchronization establishment is canceled.

Referring to FIG. 15, the process flow thereof to different from that of FIG. 14 in the following point. That is, if the received frame value is different from the ideal frame value (No at step F10) and a predicted frame value exists, or EXP=1 (No at step F32), it is further checked whether the received frame value is coincident with the predicted frame value (step F13). If the received frame value is coincident with the predicted frame value (Yes at step F13), then the step F14 is performed as described in FIG. 14. However, if the received frame value is different from the predicted frame value (No at step F13), control goes back to the step F27 where SYNC and EXP are both reset to 0 and then the intermittent receiving for pulling into synchronization is performed again. In other words in a case where the received frame value is different from both the ideal frame value and the predicted frame value, the established synchronization is canceled and control is back to the intermittent receiving for pulling into synchronization.

SIXTH EMBODIMENT

In the sixth embodiment, the prediction of next frame value is not performed as in the case of the third embodiment shown in FIG. 13. The intermittent receiving operation for pulling into synchronization is started again after synchronization establishment when the non-coincidence number NGC reaches the preset allowable number while counting cases where a sync signal fails to be detected or a fetched frame information is not normal, or the received frame value is not coincident with the ideal frame value.

Referring to FIG. 16, the process flow thereof is different from that of FIG. 13 in the following point. That is, in the established synchronization state (SYNC=1), when a sync signal fails to be detected (No at step F4) or a fetched frame information is not normal (No at step P7), control goes to the step F19 where the NGC is decremented. In other words, the NGC is decremented not only when the received frame value is not coincident with the ideal frame value (No at step F10) but also when a sync signal fails to be detected (No at step F4) or a fetched frame information is not normal (No at step F7).

The step F14 and the subsequent steps as described before are performed until the NaC becomes 0 (F20). When the NGC becomes 0 (Yes at step F20), control goes back to the initializing steps F17 and F2 where the NGC is reset to i and the SYNC is reset to 0, and then the intermittent receiving for pulling into synchronization is performed again.

The above methods of the fifth and sixth embodiments are suitable for a receiving scheme in which a receiving channel is locked to a channel of higher sensitivity by scanning a plurality of channels, which are predetermined in a system, at the time of pulling into synchronization.

Further, in a case where the synchronization is established when coincidence of a received frame value and an ideal frame value occurs consecutively at the predetermined number of times, the possibility of setting the frame counter section 108 to erroneous values at the time of synchronization establishment is thought to be very small. Therefore, the above methods are also suitable for such a case. That is, it is preferable to cancel the synchronization establishment and start the sync pull-in operation when the received frame value is different from both the ideal frame value and the predicted frame value or when non-coincidence of a received frame value and an ideal frame value occurs consecutively at the predetermined number of times.

SEVENTH EMBODIMENT

After the synchronization establishment, non-coincidence of a received frame value and an ideal frame value is thought to be caused by the frame counter section 108 set to erroneous values and/or an erroneous frame value which is received as if it were a correct frame value. Therefore, whether to use the ideal frame value or the received frame value, there is a possibility that call losses occur due to a shift of intermittent receiving timing. The following seventh and eighth embodiments can achieve the substantially reduced possibility of call losses by using two frame counter sections 108 and 208 as shown in FIG. 4.

Referring to FIG. 17, it is assumed that counters (A) and (B) indicate the frame counter section 108 and the frame counter section 208, respectively.

The steps from the step F1 to the step F8 are the same as those of FIG. 10. If the fetched frame information is not found erroneous nor out of range (Yes at step F7), then it is checked whether SYCN=0 (step F8), and the step F21 is performed before the synchronization state, that is, SYNC=0. In the step F21, the frame sync flag SYNC is set at 1 (synchronization state), the counters (A) and (B) are both set based on the received frame value, and a next ideal frame information value which should be received at the next receiving timing is calculated. After that, the intermittent receiving operation (step F3) is performed in the established frame synchronization state in accordance with the set values of the counter (A) and (B).

During the intermittent receiving operation after the frame synchronization establishment, if a frame sync signal is not detected (No at step F4) or if the frame sync signal is detected (Yes at step F4) but fetched frame information is not normal (No at step F7), since the SYNC=1 (No at step F5), the step F22 is performed. In the step F22, the counter (A) and (B) are both set based on the ideal frame value which exists at this receiving timing and a next ideal frame value which should be received at the next receiving timing is calculated. After that, the intermittent receiving operation (step F3) is performed in the established frame synchronization state in accordance with the set values of the counter (A) and (B). If the received frame value is coincident with the ideal frame value (Yes at step F10), the step F22 is also performed.

On the other hand, if the received frame value is different from the ideal frame value (No at step F1), it is checked whether a predicted frame value exists (step F12). When a predicted frame value exists (Yes at step F12), it is further checked whether the received frame value is coincident with the predicted frame value (step F13). If the received frame value is coincident with the predicted frame value (Yes at step F13), then the step F23 is performed. In the step F23, the counter (A) and (B) are both set based on the received frame value (or the predicted frame value) and a next ideal frame value which should be received at the next receiving timing is calculated. After that, the intermittent receiving operation (step F3) is performed in the established frame synchronization state in accordance with the set values of the counter (A) and (B).

If the received frame value is different from the predicted frame value (No at step F13) or no predicted frame value exists (No at step F12), then the counter (A) is set based on the ideal frame value which exists at this receiving timing (step F24) and the other counter (B) is set based on the received frame value which is just received at this receiving timing (step F25). Subsequently, a next ideal frame value which should be received at the next receiving timing is calculated based on the first set values of the counter (A) and a next predicted frame value which should be received at the next receiving timing if the received frame value is correct is calculated based on the second set values of the counter (B) (step F26). After that, the intermittent receiving operation (step F3) is performed in the established synchronization state in accordance with each of the counter (A) and the counter (B). Such an intermittent receiving operation after the frame synchronization establishment will be more specifically described hereinafter.

Referring to FIG. 18, at the receiving timing ① provided by the counter (A), it is assumed that the received frame value (C0, S0, B4) is different from the ideal frame value (C0, S0, B0) and no predicted frame value exists. In this case, the counter (A) is set based on the ideal frame value (C0, S0, B0) which exists at this receiving timing. (step F24) and the counter (B) is set based on the received frame value (C0, S0, B4) (step F25). Therefore, the batch counter of the counter (A) is set to 0 and the batch counter of the counter (B) is set to 4 at this receiving timing ①. At the same time, a next ideal frame value (C0, S0, B8) which should be received at the next receiving timing ② which is provided by the counter (B) is calculated based on the Bet values of the counter (A). On the other hand, a next predicted frame value (C0, S1, B0) which should be received at the next receiving timing ② in a case where the received frame information (C0, S0, B4) is correct in calculated based on the set values of the counter (B). These calculated ideal value and predicted value are stored onto the RAM 117.

At the receiving timing ② provided by the counter (B), if a received frame value (C0, S1, B0) is not coincident with an ideal frame value (C0, S0, B8) but the predicted frame value (C0, S1, B0) (No at step F10, Yes at step F13), the counter (A) and (B) are both set based on the received frame value, that is, the predicted frame value (C0, S1, B0). Therefore, the batch counter of the counter (A) is forced to be set to 0 and the subsequence counter of the counter (A) is forced to be set to 1. In other words, the receiving timing provided by the counter (B) is maintained in the case where the received frame value is coincident with the predicted frame value.

At the receiving timing ③ provided by the counter (A), it is assumed that a received frame value (C0, S2, B8) is again different from an ideal frame value (C0, S2, B0) and no predicted frame value exists. Therefore, as in the case of the receiving timing ①, the counter (A) is set based on the ideal frame value (C0, S2, B0) and the counter (B) is set based on the received frame value (C0, S2, B8). At the same time, a next ideal frame value (C0, S2, B4) which should be received at the next receiving timing ④ which is provided by the counter (B) is calculated based on the set values of the counter (A). On the other hand, a next predicted frame value (C0, S3, B0) which should be received at the next receiving timing ④ in a case where the received frame information (C0, S2, B8) is correct is calculated based on the set values of the counter (B). These calculated ideal value and predicted value are stored onto the RAM 117.

At the receiving timing ④ provided by the counter (B), it if a received frame value (C0, S2, B4) is coincident with an ideal frame value (C0, S2, B4) (Yes at step F10), the counter (A) and (B) are both set based on the ideal frame value, that is, the received frame value (C0, S2, B4). Therefore, the batch counter of the counter (B) is forced to be set to 4 and the subsequence counter of the counter (B) is forced to be set to 2. In other words, the receiving timing provided by the counter (A) is maintained In the case where the received frame value is coincident with the ideal frame value. It is the same with the case at the receiving timing ⑤ provided by the counter (A).

EIGHTH EMBODIMENT

In the eighth embodiment, when the sync signal fails to be detected or when a fetched frame information is not normal in the synchronization establishment state, if the counter B provides the current receiving timing or if a predicted frame value exists, a next predicted frame value is calculated based on the existing predicted frame value.

Referring to FIG. 19, the process flow thereof is different from that of FIG. 17 in the following point. That is, after power-on (step F1), a frame sync flag SYNC and a predicted value flag EXP indicating the presence or absence of a predicted value are both initialized (step F27).

If the received frame value is different from the ideal frame value (No at step F10), it is checked whether EXP=0, that is, a predicted frame value exists (step F32). When EXP=1, or a predicted frame value exists (No at step F32), it is further checked whether the received frame value is coincident with the predicted frame value (step F13). If the received frame value is coincident with the predicted frame value (Yes at step F13), then the step F23 is performed as described before, and EXP is reset to 0 (step F33). On the other hand, if the received frame value is different from the predicted frame value (No at step F13) or no predicted frame value exists (Yes at step F32), then the steps F24–F26 are performed. After that, EXP is set to 1 (step F34) and then the Intermittent receiving operation (step F3) is performed in the established frame synchronization state in accordance with each of the counters (A) and (B).

In the synchronization establishment state (SYNC=1), when the sync signal falls to be detected (No at step F4) or when a received frame information is not normal (No at step F7), it is further checked whether this receiving timing Is provided by the counter (A) (step F35).

If this receiving timing is provided by the counter (A) (Yes at step F35), it further checked whether EXP=0 (step F36). If EXP=0, that is, no predicted value exists (Yes at step F36), the step F22 is performed. If the received frame value is coincident with the ideal frame value (Yes at step F10), the step F22 is also performed after EXP is reset to 0.

If this receiving timing is provided by the counter (B) (No at step F35) or if EXP=1 (No at step F36), the counter (A) is set based on the ideal frame value which exists at this receiving timing (step F37) and the other counter (B) is set based on the current predicted frame value which was calculated at the preceding receiving timing (step F38). Subsequently, a next ideal frame value which should be received at the next receiving timing is calculated based on the set values of the counter (A) and a next predicted frame value which should be received at the next receiving timing is calculated based on the set values of the counter (B) (step F39). After that, the intermittent receiving operation (step F3) is performed in the established synchronization state in accordance with each of the counter (A) and the counter (B).

What is claimed is:

1. A method for intermittently receiving a transmission signal after synchronization establishment, the transmission signal including a frame synchronization signal and a frame identifying signal, the method comprising the steps of:

storing an ideal frame identifying value which was produced at a preceding intermittent receiving timing;

detecting a received frame synchronization signal from a received transmission signal;

detecting a received frame identifying signal from the received transmission signal to produce a received frame identifying value;

comparing the received frame identifying value with the ideal frame identifying value;

determining intermittent receiving timing based on the ideal frame identifying value when either the received frame synchronization signal or the received frame identifying signal is not detected;

determining intermittent receiving timing based on the ideal frame identifying value when the received frame identifying value is coincident with the ideal frame identifying value; and storing a next ideal frame identifying value which should be received at a next intermittent receiving timing, the next ideal frame identifying value being produced based on the ideal frame identifying value.

2. The method according to claim 1, further comprising the steps of:

determining whether a predicted frame identifying value which was predicted at the preceding intermittent receiving timing is stored when the received frame identifying value is not coincident with the ideal frame identifying value;

comparing the received frame identifying value with the predicted frame identifying value when the predicted frame identifying value is stored;

determining intermittent receiving timing based on the received frame identifying value when the received frame identifying value is coincident with the predicted frame identifying value; and storing a next predicted frame identifying value which should be received at the next intermittent receiving timing, the next predicted frame identifying value being predicted based on the received frame identifying value when the received frame identifying value is not coincident with the predicted frame identifying value.

3. The method according to claim 1, further comprising the steps of:

determining whether a predicted frame identifying value which was predicted at the preceding intermittent receiving timing is stored when the received frame identifying value is not coincident with the ideal frame identifying value;

comparing the received frame identifying value with the predicted frame identifying value when the predicted frame identifying value is stored;

determining intermittent receiving timing based on the received frame identifying value when the received frame identifying value is coincident with the predicted frame identifying value;

storing a next predicted frame identifying value which should be received at the next intermittent receiving timing, the next predicted frame identifying value being predicted based on the received frame identifying value when the predicted frame identifying value is not stored; and canceling the synchronization establishment when the received frame identifying value is not coincident with the predicted frame identifying value.

4. The method according to claim 2, further comprising the steps of:

determining whether a predicted frame identifying value which was predicted at the preceding intermittent receiving timing is stored when either the received frame synchronization signal or the received frame identifying signal is not detected; and storing a next predicted frame identifying value which should be received at the next intermittent receiving timing, the next predicted frame identifying value being predicted based on the predicted frame identifying value when it is determined that the predicted frame identifying value is stored.

5. The method according to claim 4, further comprising the steps of:

determining whether a predicted frame identifying value which was predicted at the preceding intermittent receiving timing is stored when the received frame identifying value is not coincident with the ideal frame identifying value;

comparing the received frame identifying value with the predicted frame identifying value when the predicted frame identifying value is stored;

determining intermittent receiving timing based on the received frame identifying value when the received frame identifying value is coincident with the predicted frame identifying value;

storing a next predicted frame identifying value which should be received at the next intermittent receiving timing, the next predicted frame identifying value being predicted based on the received frame identifying value when the predicated frame identifying value is not stored; and canceling the synchronization establishment when the received frame identifying value is not coincident with the predicted frame identifying value.

6. The method according to claim 1, further comprising the steps of:

counting a number of consecutive non-coincidence times the received frame identifying value is not coincident with the ideal frame identifying value; and canceling the synchronization establishment when the number of consecutive non-coincidence times reaches a predetermined value.

7. The method according to claim 1, further comprising the steps of:

counting a first number of consecutive non-coincidence times the received frame identifying value is not coincident with the ideal frame identifying value;

counting A second number of times either the received frame synchronization signal or the received frame identifying signal is not detected;

canceling the synchronization establishment when a total of the first number of consecutive non-coincidence times and the second number of times reaches a predetermined value.

8. A method for intermittently receiving a transmission signal after synchronization establishment, the transmission signal including a frame synchronization signal and a frame identifying signal, the method comprising the steps of:

storing an ideal frame identifying value which was produced at a preceding intermittent receiving timing;

detecting a received frame synchronization signal from a received transmission signal;

detecting a received frame identifying signal from the received transmission signal to produce a received frame identifying value;

comparing the received frame identifying value with the ideal frame identifying value;

determining intermittent receiving timing based on the ideal frame identifying value when either the received frame synchronization signal or the received frame identifying signal is not detected;

determining intermittent receiving timing based on the ideal frame identifying value when the received frame identifying value is coincident with the ideal frame identifying value;

storing a next ideal frame identifying value which should be received at a next intermittent receiving timing, the next ideal frame identifying value being produced based on the ideal frame identifying value;

determining whether a predicted frame identifying value which was predicted at the preceding intermittent receiving timing is stored when the received frame identifying value is not coincident with the ideal frame identifying value;

comparing the received frame identifying value with the predicted frame identifying value when the predicted frame identifying value is stored;

determining intermittent receiving timing based on the received frame identifying value when the received frame identifying value is coincident with the predicted frame identifying value;

determining intermittent receiving timing based on both the ideal frame identifying value and the received frame identifying value when the received frame identifying value is not coincident with the predicted frame identifying value;

storing a next predicted frame identifying value which should be received at the next intermittent receiving timing, the next predicted frame identifying value being predicted based on the received frame identifying value when the received frame identifying value is not coincident with the predicted frame identifying value; and storing a next ideal frame identifying value which should be received at the next intermittent receiving timing, the next ideal frame identifying value being produced based on the ideal frame identifying value when the received frame identifying value is not coincident with the predicted frame identifying value.

9. The method according to claim 8, further comprising the steps of:

determining whether a current intermittent receiving timing is provided based on the received frame identifying value;

determining intermittent receiving timing based on both the ideal frame identifying value and the received frame identifying value when the current intermittent receiving timing is provided based on the received frame identifying value;

storing a next predicted frame identifying value which should be received at the next intermittent receiving timing, the next predicted frame identifying value being predicted based on the predicted frame identifying value when the current intermittent receiving timing is provided based on the received frame identifying value; and storing a next ideal frame identifying value which should be received at the next intermittent receiving timing, the next ideal frame identifying value being produced based on the ideal frame identifying value when the current intermittent receiving timing is provided based on the received frame identifying value.

10. A wireless selective calling receiver for intermittently receiving a transmission signal after synchronization establishment, the transmission signal including a frame synchronization signal and a frame identifying signal, the receiver comprising:

storage means for storing an ideal frame identifying value which was produced at a preceding intermittent receiving timing;

first means for detecting a received frame synchronization signal from a received transmission signal;

second means for detecting a received frame identifying signal from the received transmission signal to produce a received frame identifying value;

comparing means for comparing the received frame identifying value with the ideal frame identifying value;

synchronization setting means for setting intermittent receiving timing of the receiver; and control means for controlling the synchronization setting means such that the intermittent receiving timing is determined based on the ideal frame identifying value when either the received frame synchronization signal or the received frame identifying signal is not detected and that the intermittent receiving timing is determined based on the ideal frame identifying value when the received frame identifying value is coincident with the ideal frame identifying value, and storing a next ideal frame identifying value which should be received at a next intermittent receiving timing onto the storage means, the next ideal frame identifying value being produced based on the ideal frame identifying value.

11. The receiver according to claim 10, wherein the control means further determines whether a predicted frame identifying value which was predicted at the preceding intermittent receiving timing is stored when the received frame identifying value is not coincident with the ideal frame identifying value, compares the received frame identifying value with the predicted frame identifying value when the predicted frame identifying value is stored, determines the intermittent receiving timing based on the received frame identifying value when the received frame identifying value is coincident with the predicted frame identifying value, and stores a next predicted frame identifying value which should be received at the next intermittent receiving timing onto the storage means, the next predicted frame identifying value being predicted based on the received frame identifying value when the received frame identifying value is not coincident with the predicted frame identifying value.

12. The receiver according to claim 10, wherein the control means further determines whether a predicted frame identifying value which was predicted at the preceding intermittent receiving timing is stored when the received frame identifying value is not coincident with the ideal frame identifying value, compares the received frame identifying value with the predicted frame identifying value when the predicted frame identifying value is stored, determines intermittent receiving timing based on the received frame identifying value when the received frame identifying value is coincident with the predicted frame identifying value, stores a next predicted frame identifying value which should be received at the next intermittent receiving timing, the next predicted frame identifying value being predicted based on the received frame identifying value when the predicted frame identifying value is not stored, and cancels the synchronization establishment when the received frame identifying value is not coincident with the predicted frame identifying value.

13. The receiver according to claim 11, wherein the control means further determines whether a predicted frame identifying value which was predicted at the preceding intermittent receiving timing is stored when either the received frame synchronization signal or the received frame identifying signal is not detected, and stores a next predicted frame identifying value which should be received at the next intermittent receiving timing, the next predicted frame identifying value being predicted based on the predicted frame identifying value when it is determined that the predicted frame identifying value is stored.

14. The receiver according to claim 13, wherein the control means further determines whether a predicated frame identifying value which was predicted at the preceding intermittent receiving timing is stored when the received frame identifying value is not coincident with the ideal frame identifying value, compares the received frame identifying value with the predicted frame identifying value when the predicted frame identifying value is stored, determines intermittent receiving timing based on the received frame identifying value when the received frame identifying value is coincident with the predicted frame identifying value, stores a next predicted frame identifying value which should be received at the next intermittent receiving timing, the next predicted frame identifying value being predicted based on the received frame identifying value when the predicted frame identifying value is not stored, and cancels the synchronization establishment when the received frame identifying value is not coincident with the predicted frame identifying value.

15. The receiver according to claim 10, further comprising:

counting means for counting a number of consecutive non-coincidence times the received frame identifying value is not coincident with the ideal frame identifying value, wherein the control means cancels the synchronization establishment when the number of consecutive non-coincidence times reaches a predetermined value.

16. The receiver according to claim 10, further comprising:

first counting means for counting a first number of consecutive non-coincidence times the received frame identifying value is not coincident with the ideal frame identifying value; and second counting a second number of times either the received frame synchronization signal or the received frame identifying signal is not detected, wherein the control means cancels the synchronization establishment when a total of the first number of consecutive non-coincidence times and the second number of times reaches a predetermined value.

17. A receiver for intermittently receiving a transmission signal after synchronization establishment, the transmission signal including a frame synchronization signal and a frame identifying signal, the receiver comprising:

storage means for storing an ideal frame identifying value which was produced at a preceding intermittent receiving timing;

first means for detecting a received frame synchronization signal from a received transmission signal;

second means for detecting a received frame identifying signal from the received transmission signal to produce a received frame identifying value;

comparing means for comparing the received frame identifying value with the ideal frame identifying value;

first synchronization Betting means for setting the intermittent receiving timing;

second synchronization setting means for setting the intermittent receiving timing; and control means determining intermittent receiving timing based on the ideal frame identifying value when either the received frame synchronization signal or the received frame identifying signal is not detected, determining intermittent receiving timing based on the ideal frame identifying value when the received frame identifying value is coincident with the ideal frame identifying value storing a next ideal frame identifying value which should be received at a next intermittent receiving timing, the next ideal frame identifying value being produced based on the ideal frame identifying value,. determining whether a predicated frame identifying value which was predicted at the preceding intermittent receiving timing is stored when the received frame identifying value is¬ coincident with the ideal frame identifying value, comparing the received frame identifying value with the predicated frame identifying value when the predicated frame identifying value is stored, determining intermittent receiving timing based on the received frame identifying value when the received frame identifying value is coincident with the predicted frame identifying value, determining intermittent receiving timing based on both the ideal frame identifying value and the received frame identifying value when the received frame identifying value is not coincident with the predicted frame identifying value, storing a next predicted frame identifying value which should be received at the next intermittent receiving timing, the next predicted frame identifying value being predicted based on the received frame identifying value when the received frame identifying value is not coincident with the predicted frame identifying value, and storing a next ideal frame identifying value which should be received at the next intermittent receiving timing, the next ideal frame identifying value being produced based on the ideal frame identifying value when the received frame identifying value is not coincident with the predicted frame identifying value.

18. The receiver according to claim 17, wherein the control means further determines whether a current intermittent receiving timing is provided based on the received frame identifying value, determines intermittent receiving timing based on both the ideal frame identifying value and the received frame identifying value when the current intermittent receiving timing is provided based on the received frame identifying value, storing a next predicted frame identifying value which should be received at the next intermittent receiving timing, the next predicted frame identifying value being predicted based on the predicted frame identifying value when the current intermittent receiving timing is provided based on the received frame identifying value, and storing a next ideal frame identifying value which should be received at the next intermittent receiving timing, the next ideal frame identifying value being produced based on the ideal frame identifying value when the current intermittent receiving timing is provided based on the received frame identifying value.

\* \* \* \* \*

UNITED STATES PATENT AND TRADEMARK OFFICE
CERTIFICATE OF CORRECTION

PATENT NO. : 5,854,592
DATED : December 29, 1998
INVENTOR(S) : Masayuki Kushita

It is certified that error appears in the above-identified patent and that said Letters Patent is hereby corrected as shown below:

Column 2, Line 45: "la" should read --is--

Column 3, Line 28: "predicted A" should read --predicted--

Column 7, Line 47: "program to" should read --program--

Column 9, Line 9: "SYNC" should read --SYCN--.

Column 10, Line 22: "F1)" should read --F10)--

Column 12, Line 49: "EXP-O" should read --EXP=O--

Column 13, Line 37: "to" should read --is--

Column 14, Line 11: "NaC" should read --NGC--

Column 15, Line 12: "F1)" should read --F10)--

Column 16, Line 67: "falls" should read --fails--

Column 19, Line 13, Claim 7: "A" should read --a--

Column 22, Line 33, Claim 17: "Betting" should read --setting--

UNITED STATES PATENT AND TRADEMARK OFFICE
CERTIFICATE OF CORRECTION

PATENT NO. : 5,854,592
DATED : December 29, 1998
INVENTOR(S) : Masayuki Kushita

It is certified that error appears in the above-identified patent and that said Letters Patent is hereby corrected as shown below:

Column 22, Line 51, Claim 17: "is¬" should read --is not--

Signed and Sealed this

Eighth Day of August, 2000

Attest:

Q. TODD DICKINSON

Attesting Officer

Director of Patents and Trademarks